United States Patent Office 3,479,366
Patented Nov. 18, 1969

3,479,366
HYDRAZINO-THIAZOLIDINES
Robert Burns Woodward, 12 Oxford St.,
Cambridge, Mass. 02138
No Drawing. Filed Aug. 22, 1966, Ser. No. 573,816
Claims priority, application Switzerland, Sept. 10, 1965,
12,623/65; Dec. 9, 1965, 16,969/65; Jan. 13, 1966,
446/66
Int. Cl. C07d 91/18; A61k 27/00
U.S. Cl. 260—306.7      9 Claims

ABSTRACT OF THE DISCLOSURE 5-hydrazino-thiazolidines, in which the hydrazino group is N,N'-disubstituted by esterified carboxyl groups, and a process for their preparation wherein a saturated cyclic thioether which is unsubstituted in at least one α-position is reacted with an azo-dicarboxylic acid ester. The 5-hydrazino-thiazolidines are useful as intermediates for the synthesis of 7-amino-cephalosporanic acid and derivatives thereof.

---

The present invention provides a novel method for the manufacture of hydrazine compounds, which was used in the production of valuable intermediate products, especially in the first synthetic production of 7-amino-cephalosporanic acid and its derivatives, and lends itself particularly well to this peculiar synthesis.

7-amino-cephalosphoranic acid corresponds to the Formula XVI

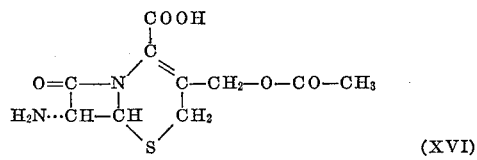

Derivatives are in the first place N-acyl compounds, in which the acyl residues are preferably those of active N-acyl derivatives of 7-amino-cephalosporanic acid, such as the thienylacetyl, e.g. 2-thienylacetyl, cyanocetyl, chloroethylcarbamyl or phenylacetyl residue, or acyl radicals readily eliminable, such as the residue of a carbonic acid semi-ester, for example, the tertiary butyl-oxycarbonyl residue.

The synthesis of this compound and of its derivatives, which are important for the manufacture of valuable medicaments, is based on the use as starting material of a 3,5-unsubstituted 2,2 - disubstituted thiazolidine - 4-carboxylic acid, for example a compound of the Formula I

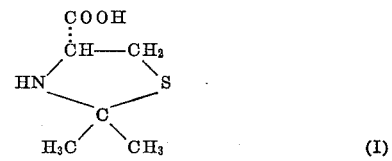

and to carry out the novel synthesis, for example, according to the following scheme of formulae:

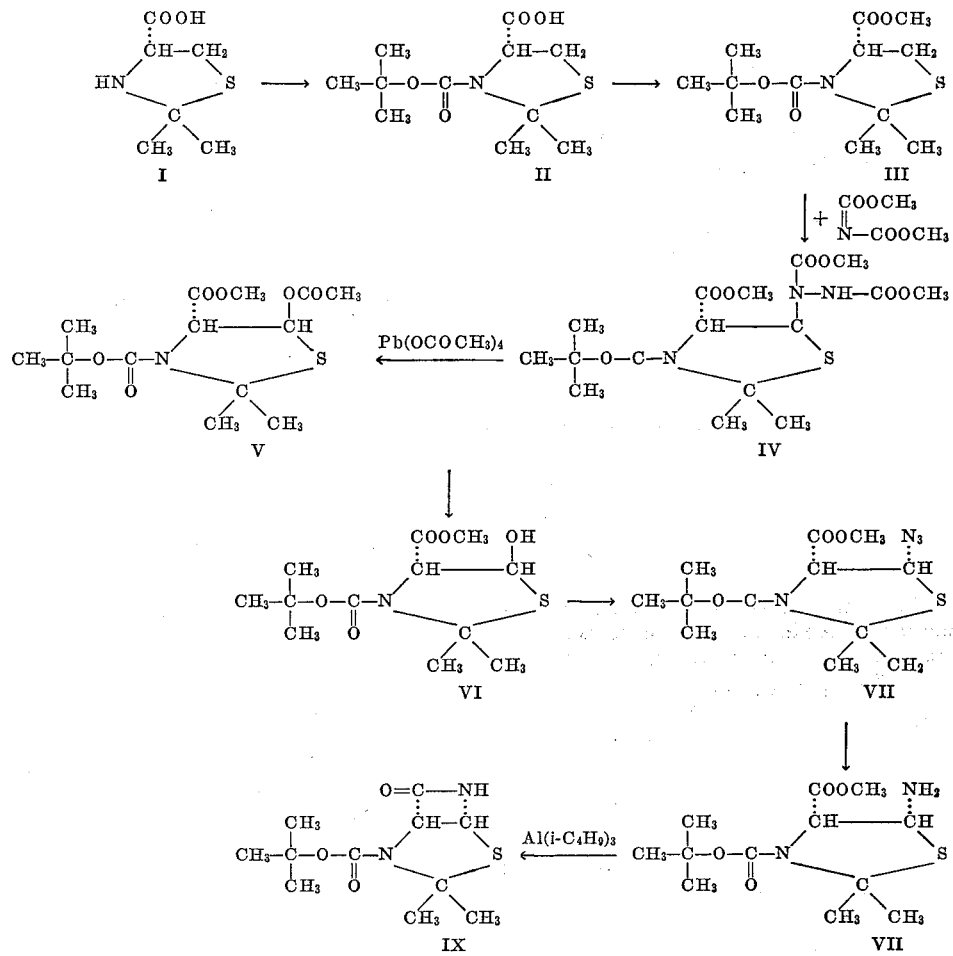

The compound IX is converted into the desired 7-amino-cephalosporanic acid and its derivatives as follows:

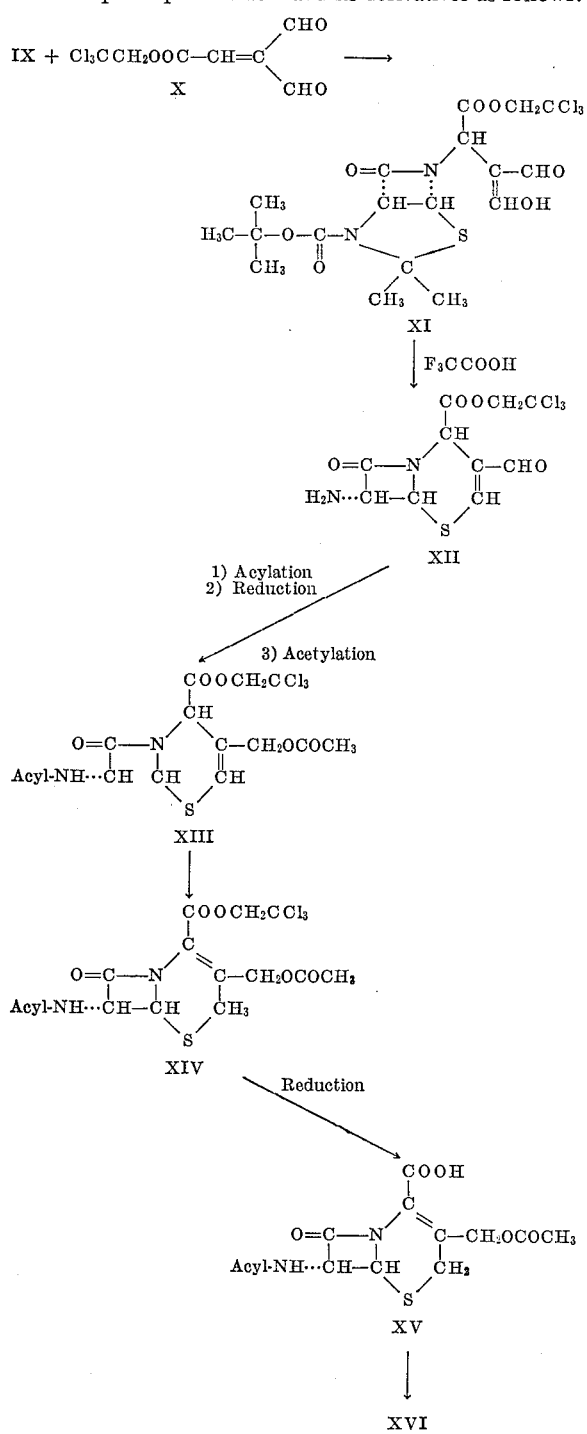

1) Acylation
2) Reduction
3) Acetylation

Reduction

The compound of the formula X, used as intermediate, is prepared in the following manner:

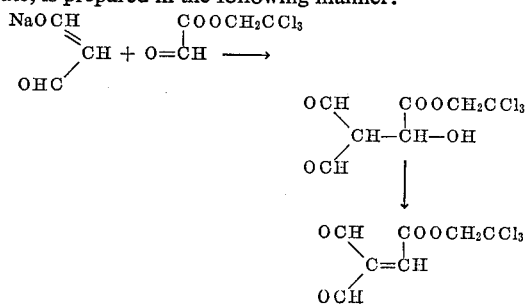

(X)

The above-mentioned hydrazine compounds, which are valuable intermediate products, for example the compound of the Formula IV, are unexpectedly obtained by reacting a saturated cyclic thioether which is unsubstituted in at least one α-position, for example the compound of the Formula III, with an azodicarboxylic acid ester, and, if desired, substituting the hydrazino group in the resulting compound and/or converting a substituent into another substituent, and/or resolving a resulting mixture of isomers into its constituent isomers.

According to the present invention the reaction can be carried out for example, by reacting the thioether with the azo-dicarboxylic acid diester in the presence or absence of a diluent, preferably at an elevated temperature, but below the temperature at which the azo-dicarboxylic acid ester used decomposes, if necessary, under an inert gas and/or under superatmospheric pressure.

In a resulting compound the hydrazino group may be subsequently substituted. For example, in a product obtained by the above process the residue of the alcohol esterifying the carboxyl groups of the azo-ester may replace the hydrogen of the hydrogen-containing nitrogen atom of the hydrazino group at a temperature at which the thermal decomposition of the azo-ester sets in.

Substituents present in a resulting compound may be converted into other substituents. A resulting acid derivative, such as an ester, may be converted, for example, in known manner into the free acid without removing the acyl group, especially a readily eliminable acyl group, such as the tertiary butyloxycarbonyl group, in position 3. Thus, a carbo-lower alkoxy group, such as the carbonmethoxy group, can be hydrolyzed to form the free carboxylic group by treatment with a dilute alkali, such as potassium hydroxide solution. Then, by a peculiar method it is possible, for example, to convert a carboxyl group esterified with a 2,2,2-trihalogenoethanol, especially 2,2,2-trichlorethanol, by means of a reducing agent into the free carboxyl group. Suitable reducing agents are chemical reducing agents, such as nascent hydrogen obtained, for example, by reacting metals, metal alloys or amalgams upon hydrogen donors, such as zinc, zinc alloys (for example zinc copper) or zinc amalgam in the presence of acids, such as organic carboxylic acids, for example acetic acid, or alcohols, such as lower alkanols, alkali metal amalgam, for example sodium or potassium amalgam, or aluminium amalgam, in the presence of moist ether or of lower alkanols; furthermore alkali metals, for example, lithium, sodium or potassium, or alkaline earth metals, for example, calcium, in liquid ammonia, if desired, with addition of alcohols, such as a lower alkanol. An ester of an acid with a 2,2,2-trihalogenoethanol, especially 2,2,2-trichlorethanol may also be converted into the free acid by treatment with strongly reducing metal salts, such as chromium-II-compounds, such as chromium-II-chloride or chromium-II-acetate, preferably in the presence of an aqueous medium, containing organic solvents miscible with water, such as lower alkanols, lower alkane carboxylic acids or ethers, e.g. ethanol, acetic acid, tetrahydrofuran, dioxane, ethyleneglycol, dimethyl ether or diethyleneglycol dimethyl ether.

A free carboxyl group present in a resulting compound can be converted by known methods into its derivatives, for example, its esters, amides, hydrazides or azides. Inter alia, it may be esterified, for example by treatment with a diazo compound, such as a diazo-lower alkane, for example diazo-methane or diazo-ethane, or a phenyldiazo-lower alkane, e.g. diphenyldiazomethane, or by reaction with a hydroxy compound suitable for esterification, for example, an alcohol, a phenol compound, or an N-hydroxy-nitrogen compound, for example a hydroxamic acid, in the presence of an esterifying agent, such as a carbodiimide, for example dicyclohexyl carbodiimide, and of carbonylidiimidazole, or by any other known and suitable esterifying method, such as reaction of a salt or acid with a reactive ester of the hydroxy compound, especially of an alcohol, and a strong inorganic acid or a strong organic sulfonic acid, if desired, in the presence of a salt-forming base. Amides, such as N-sulphonylamides, are accessible by known methods, for example by treating the free carboxylic acid obtained with a sulphonylisocyanate.

A functionally modified carboxyl group in a resulting compound can be converted by known methods into another functionally modified carboxyl group, for example esterified carboxyl groups by transesterification, such as treatment with a hydroxy compound in the presence of a transesterification catalyst. Furthermore, esters, especially activated esters, for example, esters formed with a N-hydroxy-nitrogen compounds or anhydrides formed with haloformic acid esters, by reaction with other hydroxy compounds, such as alcohols or phenols, or with ammonia, primary or secondary amines or hydrazine, may be converted into other esters or into amides or hydrazides. A nitrogen atom containing hydrogen in a resulting amide or hydrazide compound can be subsequently substituted, for example, by treatment with derivatives of a carboxylic or sulphonic acid, such as a halide thereof and/or a reactively esterified alcohol or by means of other, suitable reagents. An N-unsubstituted amide can be converted into the nitriles, for example by dehydration.

A resulting mixture of isomers can be resolved into the individual isomers by known methods, for example on the basis of physico-chemical differences, such as by fractional crystallization or distillation, column or thin-layer chromatography, as well as by forming mixtures of diastereoisomeric salts, separating the resulting mixtures into their salt components and liberating the isolated salts, or by other operations suitable for separating mixtures of isomers.

The present invention also includes any modification of the process in which an intermediate obtained is used as starting material and subjected to any remaining step or steps or the process if discontinued at any stage thereof; furthermore, starting materials may be used in the form of derivatives, for example of salts, or may be formed in situ.

It is preferable to use starting materials and reaction conditions that give rise to the compounds referred to above as being particularly valuable.

The process products of this invention are saturated cyclic α-hydrazino-thioethers in which the hydrazino group is N,N'-disubstituted by esterified carboxyl groups, for example 5-hydrazino-thiazolidines, in which the hydrazino group is N,N'-disubstituted by esterified carboxyl groups. These compounds are above all 2,2-disubstituted 3-acyl-5-hydrazino-thiazolidine-4-carboxylic acids in which the hydrazino group is N,N'-disubstituted by esterified carboxyl groups and especially their functional derivatives, such as the compounds of the Formula IVa

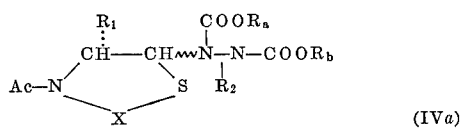

(IVa)

where Ac represents an acyl group, especially one of the acyl groups mentioned above, X represents the disubstituted carbon atom of the thiazolidine ring, $R_1$ a free or functionally modified carboxyl group, $R_a$ and $R_b$ each represents the residue of an alcohol and $R_2$ a hydrogen atom or a hydrocarbon residue.

Acyl radicals Ac are in the first place those which occur in pharmacologically active N-acyl derivatives of 7-amino-cephalosporanic acid, for example the thienylacetyl, e.g. 2-thienylacetyl, chloroethylcarbamyl or phenylacetyl radical, or acyl radicals that are easy to eliminate, such as the residue of a carbonic acid semi-ester, for example the tertiary butyloxycarbonyl residue.

The residue —X— represents primarily the group of the formula

where $R_3$ and $R_4$ each represents a hydrocarbon residue, especially an aliphatic hydrocarbon residue, such as lower alkyl, for example, ethyl, n-propyl, isopropyl or preferably methyl groups, or aromatic, especially phenyl groups, or araliphatic hydrocarbon residues, especially phenylalkyl, for example benzyl or phenylethyl groups, as well as functionally converted, particularly esterified carboxyl groups, such as carbo-lower alkoxy, e.g. carbomethoxy or carbalkoxy groups, or, together, represent a bivalent hydrocarbon residue, especially an aliphatic hydrocarbon residue, such as a lower alkylene residue, for example 1,4-butylene or 1,5-pentylene group, as well as a phthaloyl group, or represent an oxo or thiono group. The above-mentioned hydrocarbon residues are unsubstituted or may be substituted, for example by lower alkyl such as methyl or ethyl groups, by lower alkoxy such as methoxy or ethoxy groups, by halogen, such as fluorine, chlorine or bromine atoms, by halogenoalkyl such as trifluoromethyl groups or by other suitable groups.

The group $R_1$ represents a free carboxyl group or preferably a functionally modified carboxyl groups, especially an esterified carboxyl group. The latter may be esterified with any desired hydroxy compound suitable for the esterification of carboxylic acids, especially with aliphatic alcohols such as alkanols, especially lower alkanols, for example, methanol, ethanol, n-propanol or tertiary butanol, or cycloaliphatic alcohols such as cycloalkanols, for example cyclohexanol, or araliphatic alcohols such as phenylalkanols, for example benzyl alcohol, or with phenol compounds, especially phenol, or with N-hydroxy-nitrogen compounds such as hydroxamic acids, for example N-hydroxy-carbamic acid esters such as the methyl ester, or N-hydroxy-imides, for example N-hydroxysuccinimide. The afore-mentioned hydroxy compounds may be unsubstituted or substituted by lower alkyl, lower alkoxy, nitro or trifluoromethyl groups or preferably by halogen atoms or other groups. Hydroxy compounds that are particularly suitable for esterifying the carboxylic acid are halogenated lower alkanols, such as 2,2,2-trichlorethanol.

Other functionally modified carboxyl groups $R_1$ are, for example, nitrogen-containing functionally modified carboxyl groups, such as carbamyl groups the nitrogen atom of which may be unsubstituted or mono- or disubstituted by aliphatic, alicyclic, aromatic or araliphatic hydrocarbon residues or heterocyclic residues of aromatic character, which may contain lower alkyl groups or free, esterified or etherified hydroxy groups, such as lower alkoxy, aralkoxy, lower alkanoyloxy or aroyloxy groups or halogen atoms, nitro or trifluoromethyl groups, being lower alkyl, cycloalkyl, phenyl, phenyl-lower alkyl, phenyl-lower alkylidene or pyridyl residues, or may be mono- or disubstituted on the nitrogen atom by free, etherified or esterified hydroxyl groups (such as those mentioned above), by phosphor-containing residues or by acyl radicals, such as the radicals of carboxylic acids, for example, residues of carbonic acid semi-esters or semi-amides, or lower alkanoyl residues, or of sulphonic such as arylsulphonic acids, for example, phenylsulphonyl residues, as well as nitrile groups, azidocarbonyl groups or hydrazinocarbonyl or azocarbonyl groups the nitrogen atoms of which may be mono- or poly-substituted, for example, by the above-mentioned substituents of the carbamyl group.

Residues of alcohols $R_a$ and $R_b$ are, for example, the residues of the above-mentioned alcohols suitable for esterifying the carboxyl group $R_1$, especially of aliphatic alcohols, such as lower alkanols or substituted, in the first place halogenated, lower alkanols.

The group $R_2$, which preferably represents a hydrogen atom, may also stand for a hydrocarbon residue, especially for the residue $R_a$ or $R_b$.

As the formula scheme illustrates the compounds obtained according to the present invention may be converted into 7-amino-cephalosporanic acid and its derivatives; this conversion is carried out, for example, according to the procedure described in applications Serial Nos. 573,891, 573,890, 573,865, 573,815, 573,886, 573,866 and 573,876, all filed Aug. 22, 1966.

Some of the starting materials used in the above process are known. New starting materials can be prepared by known methods or as described below. Preferably, starting materials that are suitable for the manufacture of the preferred 2,2-disubstituted 3-acyl-5-hydrazino-thiazolidine-4-carboxylic acids, in which both nitrogen atoms of the hydrazino group are substituted by an esterified carboxyl group each, and of their derivatives, contain no acid groups, that is to say that in the corresponding starting materials the 4-carboxyl group is preferably functionally modified, for example esterified.

The new 5-unsubstituted 2,2-disubstituted 3-tertiary butyloxycarbonyl-thiazolidine - 4-carboxylic acids and their derivatives, above all the esters and nitrogen-containing acid derivatives, especially the amides, hydrazides, azides or nitriles of such acids, primarily the acids of the Formula IIa

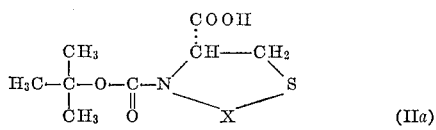

(IIa)

wherein X has the meaning defined above, and their esters as well as nitrogen-containing functional derivatives, especially amides, hydrazides, azides or nitriles, and particularly the acid of the Formula IIb

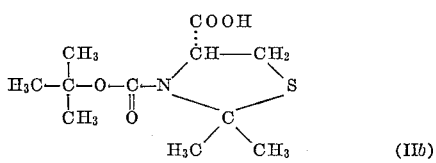

(IIb)

and its esters, advantageously lower alkyl and halogeno-lower alkyl esters, as well as nitrogen-containing acid derivatives such as amides, hydrazides, the azide or nitrile which, apart from other N-acyl compounds which are used as preferred starting materials in the above process, can be obtained by reacting a carbonic acid dihalide and tertiary butanol directly with a 3,5-unsubstituted 2,2-disubstituted thiazolidine-4-carboxylic acid or stepwise with an ester thereof, and, if desired, converting a resulting acid into a derivative, especially into an ester, as well as into a nitrogen-containing acid derivative, such as an amide, hydrazide, azide or nitrile, or a resulting derivative, for example an ester, into the acid or into another derivative, for example another ester, or into a nitorgenous acid derivative, for example an amide, hydrazide, azide or nitrile.

The above reaction for the manufacture of the specific starting materials may consist, for example, in treating the 5-unsubstituted 2,2-disubstituted thiazolidine-4-carboxylic acid, especially an acid of the Formula Ia

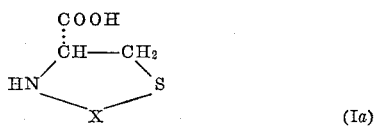

(Ia)

with a mixture of a carbonic acid dihalide, especially of phosgene, and tertiary butanol, the tertiary butyloxy-carbonylhalide, especially the tertiary butyloxycarbonyl chloride, being formed. The reaction is advantageously carried out in the presence of a base, such as an organic base, for example pyridine, collidine or triethylamine, and in the presence or absence of an additional solvent, advantageously while cooling and/or in the atmosphere of an inert gas, for example nitrogen.

The stepwise introduction of the tertiary butyloxycarbonyl residue into an ester of a 3,5-unsubstituted 2,2-disubstituted thiazolidine-4-carboxylic acid, especially into an ester of the acid of the Formula Ia, is achieved, for example, by treating the ester with a carbonic acid dihalide and reacting the resulting 5-unsubstituted 2,2-disubstituted 3 - halogenocarbonyl-thiazolidine-4-carboxylic acid ester with tertiary butanol or with a suitable organometal derivative thereof.

Treatment of the ester with a carbonic acid dihalide, especially with phosgene, is preferably carried out in the presence of a suitable base, for example, dimethylaniline or pyridine, in the absence or preferably in the presence of a solvent, if necessary with cooling and/or in a closed vessel and/or in an inert gas, for example, nitrogen.

The treatment of the 3-halogenocarbonyl-, especially 3-chlorocarbonyl-thiazolidine - 4 - carboxylic acid ester obtained as an intermediate is carried out with tertiary butanol, preferably while heating and, if necessary, in a closed vessel, for which purpose, for example, isobutylene may be used as acid acceptor, or alternatively with a suitable organometal compound of tertiary butanol, for example a tertiary butyloxy magnesium halide, such as the chloride, bromide or especially iodide, or with an alkali metal tertiary butylate, such as sodium or potassium tertiary butylate, if necessary with cooling or heating and/or under superatmospheric pressure and/or in an inert gas.

In an acid obtained by the above process the carboxyl group can be functionally modified for example esterified or amidated by known methods; or in a resulting acid derivative the functionally modified carboxyl group can be converted into the free or into another functionally modified carboxyl group. These additional process steps are carried out like those described above.

The following examples illustrate the invention.

Example 1

219.3 grams of L-2,2-dimethyl-3-tertiary butyloxy-carbonyl-thiazolidine-4-carboxylic acid methyl ester and 1165 g. of azo-dicarboxylic acid dimethyl ester are heated in a dry glass vessel equipped with agitator and reflux condenser for 45 hours at 102 to 108° C. with stirring and exclusion of atmospheric humidity. The liquid is then cooled to about 45 to 50° C., poured into a centrifuging vessel, seeded and kept overnight in the stoppered vessel. The excess of azodicarboxylic acid dimethyl ester is separated from the crystalline material by treatment for about 5 minutes in a centrifuge operated at 2800 revolutions per minute, and the crystalline material is then stirred with a total of about 500 to 600 ml. of benzene. The mixture is once more centrifuged, the supernatant solution decanted and the crystalline material once more stirred with a 3:7-mixture of hexane and ether (total volume 500–600 ml.) and centrifuged. The crystalline product obtained in this manner is filtered off and washed with the hexane-ether mixture, to yield the L-2,2-dimethyl-3-tertiary butyloxycarbonyl - 5β - (N,N'-dicarbomethoxy-hydrazino)-thiazolidine-4-carboxylic acid methyl ester of the formula

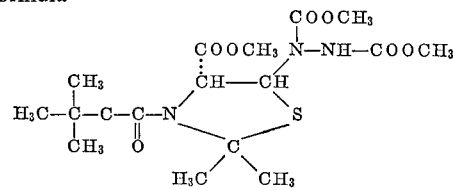

which melts at 136–137.5° C. Optical rotation $$[\alpha]_D = +98° \pm 1°$$

(c.=1.45 in chloroform). Infrared absorption bands (in methylenechloride) at 2.95, 5.70–5.90, 7.35, 7.50, 8.61, 9.35, 10.06, 10.34 and 11.65μ.

The resulting filtrates are evaporated and the residual oil distilled in a high vacuum; the excess of azodicarboxylic acid dimethyl ester is recovered by distillation (B.P. about 90° C. under 0.5 mm. Hg). The residual red, viscous oil is dissolved in 4000 ml. of ethyl acetate, extracted with 4 portions of 1500 ml. of ice-cold 0.1 N-sodium hydroxide solution and then washed with 3 portions of 2000 ml. of ice-cold water. The organic solution is dried over magnesium sulphate and evaporated, to furnish a clear, yellow, viscous oil which crystallizes on addition of hexane and a small quantity of ether. The crystalline product is washed with a 7:3-mixture of hexane and ether, and dried, to yield a further quantity of L-2,2-dimethyl - 3 - tertiary butyloxycarbonyl-5β-(N,N'-carbomethoxy-hydrazino) - thiazolidine - 4 - carboxylic acid methyl ester. Some more material can be isolated from the mother liquor.

The starting material is prepared as follows:

A suspension of 80 g. of L-cysteine methyl ester hydrochloride in 1250 ml. of acetone is refluxed with stirring for 4 hours. The reaction mixture is then stirred on for 2 hours at room temperature, the crystalline material filtered off and cautiously washed with 500 ml. of acetone. After drying and recrystallization from a 5:1-mixture of acetone and methanol the desired L-2,2-dimethyl-thiazolidine-4-carboxylic acid methyl ester hydrochloride melts at 131.5–134.5° C. with decomposition. Optical rotation $[\alpha]_D = -70° \pm 0.5°$ (c.=1.97 in methanol.) Infrared absorption bands (in potassium bromide) at 5.76, 7.50 and 8.02μ.

173.8 grams of L-2,2-dimethyl-thiazolidine-4-carboxylic acid methyl ester hydrochloride are cautiously added in small portions to a mixture of 69 g. of sodium bicarbonate, 500 g. of ice water and 500 ml. of methylenechloride. The batch is stirred, the methylenechloride phase separated and the aqueous solution extracted with 2× 200 ml. of methylenechloride. The combined organic solutions are dried over magnesium sulphate and evaporated under diminished pressure. The resulting oil is distilled under vacuum, to yield L-2,2-dimethyl-thiazolidine-4-carboxylic acid methyl ester boiling at 52° C. under 0.4 mm. Hg pressure. Optical rotation $[\alpha]_D = -189°$ (c.=1.63 in chloroform). Infrared absorption bands (film) at 3.05, 5.75, 7.00 and 7.5μ.

Phosgene is passed for one hour through a solution of 135 g. of L-2,2-dimethyl-thiazolidine-4-carboxylic acid methyl ester and 93.2 g. of dimethylaniline in 1000 ml. of methylenechloride. During the reaction the temperature is maintained at 20° C. The solvent and the excess of phosgene are cautiously expelled, to leave a viscous material which is treated with 500 ml. of a 4:1-mixture of benzene and hexane. The batch is kept for 10 hours at 0° C., then filtered, and the filtrate is washed with water and dried over magnesium sulphate. The solvent is removed under diminished pressure, to yield L-2,2-dimethyl-3-chloro-carbonyl-thiazolidine - 4 - carboxylic acid methyl ester as a viscous oil which boils at 95° C. under 0.05 mm. Hg pressure. Optical rotation $[\alpha]_D^{20} = -69°$ (c.=1.20 in chloroform). Characteristic infrared absorption band at 5.57μ (film).

A solution of 0.898 g. of the resulting product in 18 ml. of tertiary butanol (distilled over calcium hydride) is heated in a closed vessel for 12 hours at 100° C., evaporated under reduced pressure, and yields a yellow, glassy material which is dissolved in 20 ml. of methylenechloride. The solution is extracted once with 10 ml. of saturated sodium bicarbonate solution, dried over sodium sulphate and evaporated. The yellow oil obtained in this manner is chromatographed on 15 g. of anhydrous silica gel, the column being eluted with 50 ml. of benzene and then with benzene +5% of ethyl acetate. The first 25 ml. of the solvent mixture contains no material, whereas the following 60 ml. elute a colorless oil. The resulting L-2,2-dimethyl-3-tertiary butyloxycarbonyl-thiazolidine-4-carboxylic acid methyl ester of the formula

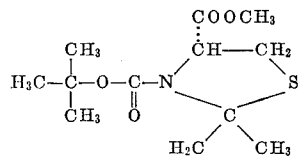

boils at 92–96° C. under 0.01 mm. Hg pressure; optical rotation $[\alpha]_D^{20} = -77°$ (c.=1.70 in chloroform); infrared absorption bands (film) at 5.74, 5.90 and 7.35μ; M.P. 18.5–21° C.

The starting material may also be obtained as follows:

A suspension of 22.6 g. of magnesium in 200 ml. of ether is mixed with a solution of 134 g. of methyl iodide in 100 ml. of ether while being stirred. The reaction mixture is then heated under nitrogen for 1 hour at 40° C. 74 grams of tertiary butanol in 100 ml. of ether are vigorously stirred dropwise into the methyl magnesium iodide solution which, on completion of the dropwise addition, is diluted with a further 950 ml. of tertiary butanol. The mixture is heated for 1 hour at 40° C. 160 grams of L-2,2-dimethyl - 3 - chlorocarbonyl - thiazolidine - 4 - carboxylic acid methyl ester in 200 ml. of ether are then slowly added and the mixture is heated for 25 hours at 40° C. under nitrogen. The bulk of the solvent is removed under reduced pressure at 40° C., and the residue is diluted with 1000 ml. of ice water and extracted with 4× 500 ml. of ether. The combined ether extracts are dried over magnesium sulphate and evaporated, to yield a viscous oil which is dissolved in 200 ml. of benzene and adsorbed on 2000 g. of anhydrous silica gel. The desired L-2,2-dimethyl-3-tertiary butyloxycarbonyl-thiazolidine-4-carboxylic acid methyl ester is eluted with benzene containing 5% of ethyl acetate. The product boils at 92–96° C. under 0.01 mm. Hg pressure and crystallizes on standing at −10° C.

The starting material may also be prepared as follows:

A mixture of 1800 ml. of methylene chloride, 144 ml. of dry tertiary butanol and 72 ml. of dry pyridine is cooled under nitrogen to −74° C., then 72 g. of phosgene are vigorously stirred in within one hour, while keeping the temperature constant at −71 to −74° C. and no gas being evolved. The reaction mixture turns faintly yellowish and pyridine hydrochloride begins to precipitate. The batch is stirred for 15 hours at −74° C. in a slow current of nitrogen, during which it turns colorless again. Then another 72 ml. of absolute pyridine and ½ hour later 57.6 g. of powdered L-2,2-dimethyl-thiazolidine-4-carboxylic acid, the latter in one lot, are added. The batch is rinsed with another 72 ml. of absolute pyridine; during the addition all moisture must be excluded.

The reaction mixture is stirred for 2½ hours at −74° C. under nitrogen, whereupon the cooling bath is replaced by an ice bath. When an internal temperature of 0° C. has been reached, the mixture is kept at this temperature for another 2½ hours, whereupon the ice bath is removed and the batch stirred for another hour, during which it again turns faintly yellowish. The reaction mixture is poured over a mixture of 2700 g. of ice and an ice-cold solution of 180 g. of sodium hydroxide, and the reaction vessel is flushed with 3600 ml. of a 1:1-mixture of benzene and ether. The washing liquor is combined with the aqueous mixture and stirred for 10 minutes, whereupon it loses its color. The organic phase is separated and washed with 3× 480 ml. of ice-cold 2 N-sodium hydroxide solution. The combined alkaline extracts are washed with 5× 1400 ml. of methylenechloride, cooled with ice, mixed with 1800 ml. of cold methylenechloride, and adjusted to pH about 4 by stirring in solid citric acid. The aqueous phase is separated and extracted with 3× 1800 ml. of methylenechloride; the combined extracts are dried over sodium sulphate and the colorless solution is evaporated under reduced pressure at a bath temperature of 45° C. The resulting faintly yellowish oil is dried for one hour under a pressure of 0.5 mm. Hg, dissolved in about 1000 ml. of warm pentane, and the solution is concentrated to about 300 ml., and kept for several hours at room temperature, to yield L-2,2-dimethyl-3-tertiary butyloxycarbonyl-thiazolidine-4-carboxylic acid of the formula

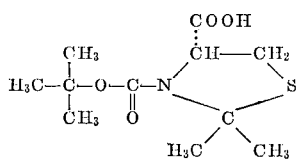

in crystalline form. It melts at 114–114.5° C. Optical rotation $[\alpha]_D^{20} = -80°$ (c.=1.34 in chloroform). It is washed at room temperature with pentane. Chromatography of the mother liquor produces a further quantity of the desired acid.

A solution of 25 g. of L-2,2-dimethyl-3-tertiary butyloxycarbonyl-thiazolidine-4-carboxylic acid in 100 ml. of dry ether, containing 1 ml. of methanol, is treated, while being cooled in an ice bath, portionwise with an ethereal diazomethane solution until the yellowish green color persists for 15 minutes. The solvent is evaporated and the residual yellowish oil distilled. The main fraction boils at 91° C. under 0.15 mm. Hg pressure. The L-2,2-dimethyl-3-tertiary butyloxycarbonyl-thiazolidine-4-carboxylic acid methyl ester obtained in this manner is identical with the product obtained by the process previously described.

The above esterification may also be carried out as follows:

A solution of 52.2 g. of L-2,2-dimethyl-3-tertiary butyloxycarbonyl-thiazolidine-4-carboxylic acid in 1000 ml. of dry toluene is treated with 29.8 g. of dimethylformamide dimethylacetal and heated during 5 hours at 105° C. After cooling to 0° C., the reaction mixture is washed twice with 50 ml. each of cold 1 N aqueous sodium hydrogen carbonate and water, dried over sodium sulfate and evaporated under reduced pressure. Upon distillation of the oily residue one obtains the L-2,2-dimethyl-3-tertiary butyloxycarbonyl-thiazolidine-4-carboxylic acid methyl ester, B.P. 92–96°/0.01 mm.

By carefully acidifying the alkaline extract at 0° C. and extracting with ether, a small amount of the unreacted L - 2,2 - dimethyl - 3 - tertiary butyloxycarbonyl-thiazolidine-4-carboxylic acid can be isolated. It can also be obtained from its esters according to the following method:

In the course of 21 hours 41.6 ml. of 1 N aqueous potassium hydroxide solution are added to a solution of 11.5 g. of L-2,2-dimethyl-3-tertiary butyloxycarbonyl-thiazolidine-4-carboxylic acid methyl ester in 80 ml. of p-dioxane and 10 ml. of water. The reaction mixture is stirred on for 20 hours at room temperature under nitrogen. The bulk of the solvent is evaporated at room temperature under reduced pressure and the residue is mixed with 20 ml. of water. The aqueous solution is extracted with ether, acidified at 0° C. with citric acid and then extracted with ether. The ether extract is washed with water, dried over magnesium sulphate and evaporated at room temperature under vacuum. The viscous material crystallizes spontaneously to yield pure 2,2-dimethyl-3-tertiary butyloxycarbonyl-thiazolidine-4-carboxylic acid by crystallization from 100 ml. of hexane. It melts at 114–114.5° C. Optical rotation $[\alpha]_D^{20} = -85°$ (c.=1.34 in chloroform). Infrared absorption bands at 5.80 and 5.95μ (in chloroform) and at 5.70 and 5.97μ (in potassium bromide). A further quantity of the product is obtained from the mother liquor.

Example 2

A mixture of 100 g. of L-2,2-dimethyl-3-tertiary butyloxycarbonyl-thiazolidine-4-carboxylic acid methyl ester and 450° G. of azo-dicarboxylic acid dimethyl ester is heated at 140° C., the crude product extracted with cold dilute sodium hydroxide solution and water, the residue chromatographed on alumina (activity III) and eluted with benzene, to yield a viscous, almost colorless product which can be purified for analysis by being subjected to a rapid evaporation distillation at 130 to 140° C. under 0.0005 mm. Hg pressure. This product is L-2,2-dimethyl-3-tertiary butyloxycarbonyl-5β-(N,N'-dicarbomethoxy-N'-methylhydrazino)-thiazolidine-4-carboxylic acid methyl ester of the formula

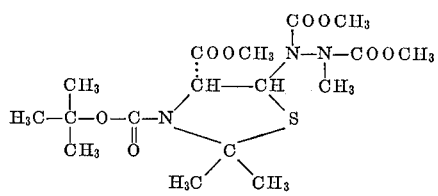

Optical rotation $[\alpha]_D = +70° \pm 1°$ (c.=1.297 in chloroform). Infrared absorption bands (in methylenechloride) at 5.85, 6.96, 7.07, 7.25, 7.35, 7.53, 8.35, 8.6, 9.2, 9.35, 10.05 and 10.38μ.

Example 3

A mixture of 2.39 g. of L-2-2-dimethyl-3-tertiary butyloxycarbonyl-thiazolidine-4-carboxylic acid amide and 10 g. of azo-dicarboxylic acid diethyl ester is heated for 12 hours at 100° C. and the excess of azo-dicarboxylic acid diethyl ester is then distilled off at 90° C. under reduced pressure. The residue is again dissolved by heating in 9 g. of the azo-dicarboxylic acid diethyl ester, and the mixture is then heated for 17 hours at 10–110° C. The excess azo-dicarboxylic acid diethyl ester is distilled off and the residue chromatographed on a column of 100 g. of anhydrous silica gel charged with benzene.

| Fraction | Solvent | Volume (ml.) | Weight (grams) |
|---|---|---|---|
| 1 | Benzene | 250 | 0.46 |
| 2 | do | 250 | 0.22 |
| 3 | Benzene, containing 10% ethyl acetate. | 200 | 0.01 |
| 4 | do | 200 | 0.03 |
| 5 | Benzene, containing 20% ethyl acetate. | 200 | 0.28 |
| 6 | do | 200 | 0.58 |
| 7 | do | 200 | 0.68 |
| 8 | do | 200 | 0.4 |
| 9 | do | 200 | 0.48 |
| 10 | do | 200 | 0.36 |
| 11 | do | 200 | 0.25 |
| 12 | do | 200 | 0.28 |
| 13 | do | 200 | 0.28 |
| 14 | do | 200 | 0.23 |
| 15 | do | 200 | 0.16 |
| 16 | do | 200 | 0.14 |
| 17 | Benzene, containing 30% ethyl acetate. | 200 | 0.21 |

Fractions 7 and 8 are combined and recrystallized from hexane containing a small quantity of methylenechloride. The resulting product is the hydrazo-dicarboxylic acid diethyl ester melting at 134° C.

The crystallization mother liquor is combined with the fractions 9 to 15 of the chromatogram. Fractions 16 and 17 are combined and chromatographed on 12 g. of alumina (activity IV), and the eluate (0.196 g.) obtained with 50 ml. of methylene chloride, after pre-washing with 50 ml. of benzene, is once more chromatographed together with the mother liquor and fractions 9 to 15 on 135 g. of alumina (activity IV).

| Fraction | Solvent | Volume (ml.) | Weight (grams) |
|---|---|---|---|
| 1 | Benzene | 250 | 0.03 |
| 2 | do | 250 | 0.01 |
| 3 | Benzene, containing 5% ethyl acetate. | 250 | 0.15 |
| 4 | do | 250 | 0.29 |
| 5 | do | 250 | 0.18 |
| 6 | do | 250 | 0.16 |
| 7 | Benzene, containing 10% ethyl acetate. | 250 | 0.35 |
| 8 | do | 250 | 0.34 |
| 9 | Benzene, containing 20% ethyl acetate. | 250 | 0.61 |
| 10 | do | 120 | 0.14 |
| 11 | do | 250 | 0.17 |
| 12 | do | 250 | 0.05 |

Fractions 9 to 12 are combined with the fraction obtained by elution of the renewed chromatography of fractions 16 and 17 of the first chromatogram by means of 50 ml. of methylenechloride containing 10% of ethyl acetate. The resulting L-2,2-dimethyl-3-tertiary butyloxycarbonyl-5β - (N,N'-dicarbethoxy-hydrazino) - thiazolidine-4-carboxylic acid amide of the formula

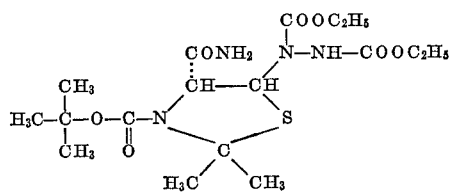

forms a glassy material. Optical rotation $[\alpha]_D = +21° \pm 1°$ (c.=0.98 in chloroform). Infrared absorption bands (in methylenechloride) at 2.85, 2.95, 5.85 (broad) 6.25, 7.35, 7.45, 8.18, 8.60, 9.25 and 9.45µ. When fractions 7+8 of the second chromatogram are once more chromatographed on alumina (activity IV) they yield a further quantity of the desired product.

The starting material is obtained as follows:

A solution of 1.305 g. of L-2,2-dimethyl-3-tertiary-butyloxycarbonyl - thiazolidine - 4 - carboxylic acid and 0.69 ml. of triethylamine in 10 ml. of methylenechloride is cooled to —10° C. and, while being stirred, treated with a solution, cooled to 0° C., of 0.48 ml. of chloroformic acid ethyl ester in 5 ml. of methylenechloride. After stirring for one hour at —10° C., dry gaseous ammonia is passed for 20 minutes at —8 to —10° C. through the suspension, whereupon triethylamine hydrochloride settles out. The mixture is slowly (within 30 minutes) brought to room temperature, mixed with a small amount of methylenechloride and gassed for 30 minutes with nitrogen. After washing with 2× 30 ml. of water the organic solution is dried over sodium sulphate and evaporated under vacuum. On heating, the resulting colorless glass crystallizes under hexane and a small amount of methylenechloride, to yield the desired L-2,2-dimethyl-3-tertiary butyloxycarbonylthiazolidine - 4 - carboxylic acid amide of the formula

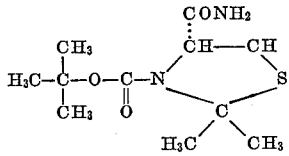

which is recrystallized from hexane containing a trace of methylenechloride at —20° C. The analytically pure product, recrystallized from hexane, melts at 113–114° C. Optical rotation $[\alpha]_D^{20} = -91°$ (c.=104 in chloroform.) Infrared absorption bands (in methylenechloride) at 2.83, 2.93, 5.90, 6.35, 7.32 and 7.45µ.

Example 4

A solution of 2.082 g. of L-2,2-dimethyl-3-tertiary butyloxycarbonyl - thiazolidine - 4 - carboxylic acid amide in 8.15 g. of azo-dicarboxylic acid dimethyl ester is heated for 45 hours at 105° C. The excess azo-dicarboxylic acid dimethyl ester is distilled off at about 80° C. under 0.5 mm. Hg pressure, the residue taken up in 1000 ml. of methylenechloride and the solution washed with 3× 50 ml. of water. On evaporation a viscous product is obtained which is chromatographed on 240 g. of a diatomaceous earth preparation. The desired L-2,2-dimethyl - 3 - tertiary butyloxycarbonyl - 5β - (N,N'-dicarbomethoxy-hydrazino)-thiazolidine - 4 - carboxylic acid amide is eluted with a 1:1-mixture of benzene and ethyl acetate and the eluate chromatographed on 85 g. of a diatomaceous earth preparation (Florisil). The resulting product of the formula

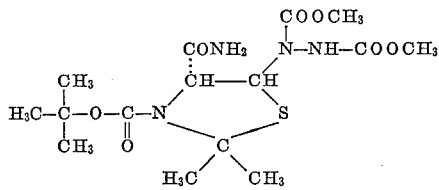

is dried at 50° C. in a high vacuum. It is amorphous. Optical rotation $[\alpha]_D = +18° \pm 1.5°$ (c.=1.518 in chloroform). Infrared absorption bands (in methylene chloride) at 2.85, 2.95, 5.75–5.90, 6.25, 6.72, 6.95, 7.05, 7.25, 7.35–7.50. 8.15, 8.62, 9.25, 940, 10.30 and 11.63µ.

Example 5

A mixture of 3.5 g. of L-2,2-dimethyl-3-tertiary butyloxycarbonyl-thiazolidine-4-carboxylic acid - N - methyl-N-phenylsulphonylamine and 10.5 ml. of azo-dicarboxylic acid dimethyl ester is heated for 65 to 70 hours at 105° C. After cooling, the excess azo-dicarboxylic acid dimethyl ester is expelled at 60 to 70° C. under 0.1 mm. Hg pressure and the residual red oil is chromatographed on a column of 320 g. of a diatomaceous earth preparation (Florisil). Benzene, and 98:2- and 95:5-mixtures of benzene and ethyl acetate (total 1500 ml.) elute only traces. 2200 ml. of a 9:1-mixture of benzene and ethyl acetate elute the bulk of the desired L-2,2-dimethyl-3-tertiary butyloxycarbonyl - 5β - (N,N' - dicarbomethoxy-hydrazino) - 4 - carboxylic acid - N-methyl-N-phenylsulphonylamide of the formula

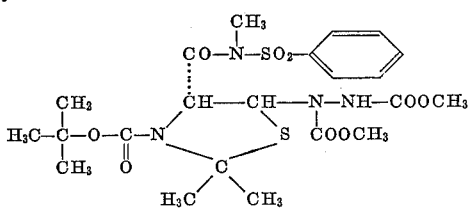

which, after crystallization from ether+hexane, melts at 161 to 163° C. Optical rotation $[\alpha]_D = +81° \pm 1°$ (c.= 1.065 in chloroform). Infrared absorption bands (in methylene-chloride) at 2.95, 5.70 (shoulder), 5.84, 5.94 (shoulder), 7.48, 8.18, 8.55, 9.33 and 11.65µ. Ultraviolet absorption bands in ethanol) $\lambda_{max}$ 224 mµ (ε=11,200), 260 mµ (ε=1100) and 267 mµ (ε=1350) and 273 mµ (ε=1100).

The starting material is obtained as follows:

0.2 gram of a 50% dispersion of sodium hydride in mineral oil is added to a mixture of 0.5 g. of L-2,2-dimethyl - 3 - tertiary butyloxycarbonyl - thiazolidine-4-carboxylic acid amide and 10 ml. of anhydrous benzene. The batch is stirred for 1 hour at room temperature with exclusion of atmospheric humidity, whereupon 10 ml. of a solution of 2 ml. of benzene sulphonylchloride, diluted with absolute benzene to 50 ml., is stirred in dropwise within 20 minutes with exclusion of moisture. The reaction mixture is stirred on for 2 hours, diluted with 30 ml of benzene and washed with 3× 50 ml. of ice-cold 0.2 N-sodium hydroxide solution and once with 15 ml. of water. The insoluble material is filtered off and combined with the cold, aqueous washing liquor. 100 ml. of benzene are added to the aqueous mixture and the batch is then acidified with about 65 ml. of 2 N-sulphuric acid. The aqueous phase is extracted once with 75 ml. of a 1:1-mixture of benzene and ether, and the combined organic extracts are washed with 75 ml. of water, dried and evaporated. The resulting crude L-2,2-dimethyl-3-tertiary butyloxycarbonyl - thiazolidine - 4 - carboxylic acid N-phenylsulphonyl-amide of the formula

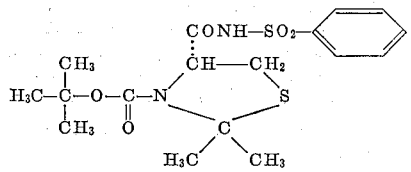

in triturated with ether, to yield the pure product which melts at 169° C. Optical rotation $[\alpha]_D = -111° \pm 1°$ (c.=0.981 in chloroform). Infrared absorption band (in methylene-chloride) at 2.98, 5.80, 5.85, 6.08, 7.23, 7.34, 7.43, 7.50, 8.46, 8.59 and 9.23mμ. Ultraviolet absorption bands (in methanol) $\lambda_{max}$ 223 mμ ($\epsilon$=10,600), 260 mμ ($\epsilon$=870), 266 mμ ($\epsilon$=1080) and 273 mμ ($\epsilon$=895).

The L - 2,2 - dimethyl - 3 - tertiary - butyloxycarbonyl - thiazolidine - 4 - carboxylic acid N - phenylsulphonyl - amide may also be obtained as follows:

A solution of 2.61 g. of L - 2,2 - dimethyl - 3 - tertiary butyloxycarbonyl - thiazolidine - 4 - carboxylic acid in 50 ml. of anhydrous benzene is mixed with 1 ml. of triethylamine and then with 20 ml. of a solution of 2 ml. of distilled benzenesulphonylisocyanate, diluted with anhydrous benzene to 25 ml., the second reagent being added in one lot. The reaction mixture is kept for 3 hours at room temperature under anhydrous conditions, during which at first a slightly exothermic reaction and a slow evolution of carbon dioxide are observed. The reaction mixture is diluted with 100 ml. of ether, and washed with 2× 30 ml. of cold 0.1 N-sodium hydroxide solution and once with water; the combined aqueous washings are extracted with 75 ml. of ether, adjusted to pH 4 with about 4 g. of citric acid and extracted with 4× 100 ml. of methylenechloride. The organic extracts are washed once with water and evaporated. On addition of ether the desired crystalline L - 2,2 - dimethyl - 3 - tertiary butyloxycarbonyl - thiazolidine - 4 - carboxylic acid N - phenylsulphonyl - amide melting at 161–164° C. is obtained.

A solution of 6 g. of L - 2,2 - dimethyl - 3 - tertiary butyloxycarbonyl - thiazolidine - 4 - carboxylic acid N - phenylsulphonyl - amide in 30 ml. of dimethylformamide and 6 ml. of methyl iodide is mixed with 2 g. of potassium tertiary butoxide. The mixture is stirred for 2 hours at room temperature and then slowly stirred into 900 ml. of a saturated aqueous sodium chloride solution. After another hour the precipitate is filtered off, washed with water and taken up in 200 ml. of methylenechloride. The organic solution is washed with water, dried and evaporated. Recrystallization from methylenechloride furnishes pure L - 2,2 - dimethyl - 3 - tertiary butyloxycarbonyl - thiazolidine - 4 - carboxylic acid N - methyl-N - phenylsulphonylamide of the formula

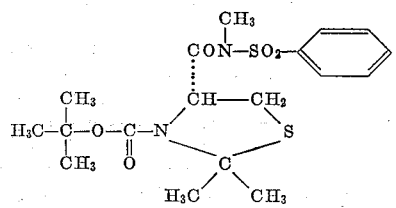

which melts at 153–154° C. Optical rotation $$[\alpha]_D = -71° \pm 1°$$

(c.=0.794 in chloroform). Infrared absorption bands (in methylenechloride) at 5.85, 5.96, 7.42, 8.30, 8.65, 9.20, 9.37, 9.95, 10.62, 10.80, 11.31 and 11.62μ. Ultraviolet absorption bands (in ethanol) $\lambda_{max}$ 225 mμ ($\epsilon$=11,600), (260 mμ ($\epsilon$=1160), 267 mμ ($\epsilon$=1350) and 273 mμ ($\epsilon$=1100).

Example 6

A solution of 2.58 g. of L - 2,2 - dimethyl - 3 - tertiary butyloxycarbonyl - thiazolidine - 4 - carboxylic acid methyl ester in 14 g. of azo-dicarboxylic acid diethyl ester is heated in an oil bath for 30 hours at 120° C. The excess azo-dicarboxylic acid diethyl ester is distilled off at 100° C. under 0.1 mm. Hg pressure, and the red viscous residue is dissolved in 60 ml. of warm benzene. The solution is chromatographed on a column containing 220 g. of a diatomaceous earth preparation in benzene. 300 ml. of benzene do not elute any material, and 500 ml. of a 19:1-mixture of benzene and ethyl acetate elute a small quantity of unreacted starting material. Elution with 1950 ml. of a 19:1-mixture of benzene and ethyl acetate furnishes L - 2,2 - dimethyl - 3 - tertiary butyloxycarbonyl - 5β - (N,N' - dicarbethoxy - hydrazino) - thiazolidine - 4 - carboxylic acid methyl ester of the formula

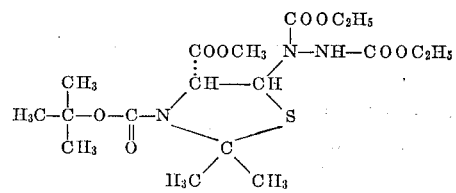

as a colorless syrup. Optical rotation $[\alpha]_D = +91° \pm 1°$ (c.=1.12 in chloroform). Infrared absorption bands (in methylenechloride) at 2.95, 5.70, 5.83, 7.35, 7.52, 8.25, 8.60 and 9.45μ.

Example 7

A mixture of 2.8 g. of L - 2,2 - dimethyl - 3 - tertiary butyloxycarbonyl - thiazolidine - 4 - carboxylic acid-2,2,2-trichloroethyl ester and 12 g. of azo-dicarboxylic acid dimethyl ester is heated for 47 hours at 100° C. The excess of azo-dicarboxylic acid dimethyl ester is distilled off at 100° C. under 0.1 mm. Hg pressure and the orange-colored, rubbery-like residue chromatographed on 240 g. of a diatomaceous earth preparation (Florisil). Benzene, containing 5% of ethyl acetate, elutes at first a small amount of starting material, and this is followed by the desired L - 2,2 - dimethyl - 3 - tertiary butyloxycarbonyl-5β - (N,N' - dicarbomethoxy - hydrazino) - thiazolidine-4 - carboxylic acid 2,2,2 - trichloroethyl ester of the formula

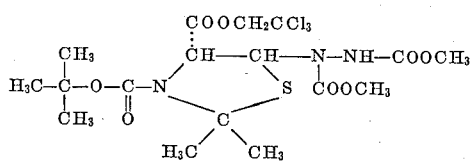

in the form of an oil. Optical rotation $[\alpha]_D^{20} = +63°$ (c.=1 in chloroform). Infrared absorption bands (in methylenechloride) at 2.90 and 5.80μ (broad).

The starting material is prepared as follows:

A solution of 3.62 g. of dicyclohexyl carbodiimide in 10 ml. of methylenechloride is added to a solution of 4.55 g. of L - 2,2 - dimethyl - 3 - tertiary butyloxycarbonyl - thiazolidine - 4 - carboxylic acid and 10 g. of trichloroethanol in 10 ml. of methylenechloride and 6 drops of pyridine. After 16 hours the N,N' - dicyclohexylurea formed is filtered off, the filtrate evaporated and the residue treated with benzene. The insoluble phase is filtered off, and the filtrate adsorbed on 240 g. of a diatomaceous earth preparation. The desired L-2,2-dimethyl - 3 - tertiary butyloxycarbonyl - thiazolidine- 4 - carboxylic acid 2,2,2 - trichloroethyl ester of the formula

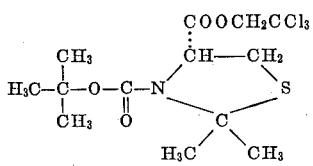

is eluted with benzene. The product crystallizes on standing in colorless rodlets from aqueous methanol, melting at 69–71° C. Optical rotation $[\alpha]_D^{20} = -70°$ (c.=1 in chloroform). Infrared absorption bands at 5.70 and 5.96μ.

From the above ester the L-2,2-dimethyl-3-tertiary butyloxycarbonyl-thiazolidine-4-carboxylic acid can be recovered in the following manner:

1 gram of freshly prepared chromium-II-acetate is added to a solution of 0.5 g. of L-2,2-dimethyl-3-tertiary butyloxycarbonyl,thiazolidine-4-carboxylic acid 2,2,2-trichloroethyl ester in 10 ml. of acetic acid and 3 ml. of water. The reaction mixture is stirred for 2 hours at room temperature under carbon dioxide and then diluted with 100 ml. of ether and 80 ml. of water, filtered, the aqueous share is separated and extracted with 80 ml. of ether. The ether extracts are twice washed with water, combined, dried and exaporated. The resulting residue is dissolved in 40 ml. of ether, the solution extracted with 2× 20 ml. of 0.2 N-sodium hydroxide solution and the alkaline extracts are washed with ether, acidified with crystalline citric acid and extracted with 3× 40 ml. of methylenechloride. The organic solutions are washed with water, dried and evaporated, to yield crystalline L-2,2 - dimethyl-3-tertiary butyloxycarbonyl-thiazolidine-4-carboxylic acid which melts at 115–117° C. after recrystallization from pentane. Optical rotation $$[\alpha]_D = -77° \pm 1°$$

(c.=0835 in chloroform).

A solution of 0.14 g. of L - 2,2-dimethyl-3-tertiary butyloxycarbonyl - thiazolidine-4-carboxylic acid 2,2,2-trichloroethyl ester in 3.5 ml. of 90% aqueous acetic acid is mixed with 1.5 g. of zinc dust and stirred for 4 hours at room temperature. The residue is filtered off and washed with 4 ml. of glacial acetic acid; the filtrate is diluted with 200 ml. of benzene and washed with 5× 35 ml. of water. The organic solution is evaporated in a water-jet vacuum and the residue recrystallized from pentane, to yield L - 2,2 - dimethyl-3-tertiary butyloxycarbonyl-thiazolidine-4-carboxylic acid melting at 113–115° C.

Example 8

A mixture of 2.208 g. of L - 2,2 - dimethyl-3-tertiary butyloxycarbonyl - thiazolidine-4-carboxylic acid methyl ester and 4.57 g. of azo-dicarboxylic acid di-2,2,2-trichloroethyl ester in 5 ml. of chlorobenzene is heated for 24 hours at a bath temperature of 120° C. After evaporation in vacuo the reaction mixture is diluted with toluene and benzene, and the solvents are again evaporated. The resulting residue is chromatographed on 400 g. of alumina (activity II) in benzene. 700 ml. of 99:1- to 93:7-mixtures of benzene and ethyl acetate elute unreacted L - 2,2-dimethyl-3-tertiary butyloxycarbonyl-thiazolidine-4-carboxylic acid methyl ester. Further elution with a total of 600 ml. of 91:9- to 86:14-mixtures of benzene and ethyl acetate furnishes the desired L-2,2-dimethyl-3-tertiary butyloxycarbonyl - 5β-[N,N'-di-(carbo - 2,2,2- trichloroethoxy)-hydrazino] - thiazolidine - 4 - carboxylic acid methyl ester of the formula

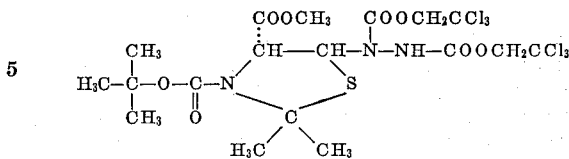

as a non-crystalline product which shows infrared absorption bands (in methylenechloride) at 2.97, 3.42, 5.65 (shoulder), 5.77, 5.90, 6.75, 7.38, 7.54, 8.33, 9.10, 9.60 and 10.10μ. A further quantity of the desired product can be eluted with a total of 1100 ml. of 82:18- to 60:40-mixtures of benzene and ethyl acetate.

The azo-dicarboxylic acid di-2,2,2-trichloroethyl ester used in the above example can be prepared in the following manner:

194 ml. of 2,2,2-trichloroethanol are added at −30° C. to 270 g. of liquid phosgene, without a reaction occurring. At the same temperature, the mixture is then diluted with 500 ml. of absolute tetrahydrofuran and then treated dropwise at −40° C. with 162 ml. of pyridine, which causes an immediate precipitation of pyridine hydrochloride. Shortly before the last of the pyridine is added the reaction mixture heats up within 30 seconds from −30 to +35° C.; the reaction is stopped by immerising the reaction vessel in a mixture of acetone and dry ice. The reaction mixture is then stirred for 1 hour under nitrogen while being cooled in the cooling mixture and then for 18 hours at room temperature. The colorless crystals are filtered off and washed with 1500 ml. of absolute ether, and the turbid organic solution is filtered through a layer of magnesium sulphate about 2 to 3 cm. thick, and then concentrated under diminished pressure and distilled, to yield the chlorocarbonic acid 2,2,2-trichloroethyl ester at 52 to 53° C. under a pressure of 9 to 10 mm. Hg.

Approximately one half of the 211.87 g. of the chlorocarbonic acid 2,2,2-trichloroethyl ester is slowly added within 30 minutes to an ice-cooled solution of 27.5 g. of hydrazine hydrate in 250 ml. of ethanol, while maintaining the temperature of the reaction mixture at 10 to 16° C. After having been diluted with 175 ml. of ethanol, the remainder of the starting material is dropwise added simultaneously with 53 g. of sodium carbonate in 100 ml. of water (time taken by the addition: 20 minutes; temperature 15–20° C.). Another 20 ml. of ethanol and 50 to 75 ml. of water are added and the mixture is stirred for 30 minutes at 10 to 15° C.; the mixture is of slightly acidic reaction. 50 ml. of a saturated solution of sodium carbonate are added (pH=about 7). The mixture is stirred for another 30 minutes and then extracted with 3× 250 ml. and then once with 100 ml. of methylenechloride. The combined organic extracts are dried over magnesium sulphate and evaporated (at 60° C. under 10 mm. Hg, then at 60° C. under 0.1 mm. Hg pressure). The resulting colorless oil crystallizes immediately and is dissolved in 500 ml. of boiling cyclohexane. On cooling, the colorless, crystalline hydrazo-dicarboxylic acid di-2,2,2-trichloroethyl ester is obtained which is dried for 48 hours at 70° C. under 10 mm. Hg pressure and recrystallized from cyclohexane, whereupon it melts at 105 to 107° C.

In the course of 10 minutes 90 ml. of fuming nitric acid are stirred into an ice-cooled mixture of 114.9 g. of hydrazodicarboxylic acid di-2,2,2-trichloroethyl ester in 300 ml. of chloroform and 60 ml. of nitric acid (d=1.4) while cooling with ice. The reaction mixture is stirred for 4 hours in an ice bath, the aqueous phase is extracted with 100 ml. of chloroform, and the combined organic solvents are washed with 6× 150 ml. of ice water. On addition of 150 ml. of absolute ether, drying over magnesium sulphate and evaporation the residue crystallizes and is kept for one week in the dark, during which time nitrogenous gases are periodically removed under reduced pressure. Recrystallization from about 500 to 600 ml. of boiling hexane furnishes the desired azodicarboxylic acid di-2,2,2-trichloroethyl ester which, on recrystallization from hexane, melts at 109.5–110.5° C. Infrared absorption bands (in methylenechloride) at 5.59, 7.32, 8.33, 9.45, 9.85 and 12.30μ. Ultraviolet absorption band (in cyclohexane) $\lambda_{max}$=415 mμ ($\epsilon$=35). From the mother liquor an additional quantity of the desired product can be obtained.

Example 9

In the course of 18 hours 7 ml. of 1 N aqueous sodium hydroxide solution are stirred at room temperature and under nitrogen into a solution of 2.82 g. of L-2,2-dimethyl-3-tertiary butyloxycarbonyl - 5β-(N,N' - dicarbethoxy-hydrazino)-thiazolidine-4-carboxylic acid methyl ester in 20 ml. of dioxane and 10 ml. of water. The reaction mixture is left to itself for 9 hours, then diluted with 150 ml. of water, extracted with 150 ml. and with 100 ml. of ether, and the organic extracts are washed with 100 ml. of water. The aqueous solutions are combined, acidified with 3 g. of citric acid and extracted with 3× 100 ml. of methylenechloride. The organic extracts are washed once with water, dried and evaporated, to yield oily L-2,2 - dimethyl-3 - tertiary butyloxycarbonyl-5β-(N,N'-dicarbethoxy - hydrazino) - thiazolidine-4-carboxylic acid of the formula

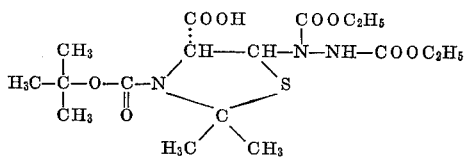

Optical rotation $[\alpha]_D^{20}$=+71°±1° (c.=1.109 in chloroform). Infrared absorption bands (in methylenechloride) at 2.96, 5.72 (shoulder), 5.86 (broad), 7.34, 8.64, 8.96, 9.24 and 11.51μ.

Reesterfication of 0.19 g. of the resulting acid with ethereal diazomethane gives rise to L-2,2-dimethyl-3-tertiary butyloxycarbonyl-5β-(N,N' - dicarbethoxy-hydrazino)-thiazolidine-4-carboxylic acid methyl ester. Optical rotation $[\alpha]_D^{20}$=+76°±1° (c.=0.877 in chloroform). Its infrared spectrum is identical with that of the product obtained in Example 6.

Example 10

In the course of 20 hours 12.8 ml. of 1 N aqueous sodium hydroxide solution are stirred under nitrogen in portions of 0.2 ml. each into a solution of 5.06 g. of L-2,2-dimethyl-3-tertiary butyloxycarbonyl-5β - (N,N'-dicarbomethoxy-hydrazino)-thiazolidine-4-carboxylic acid methyl ester in 40 ml. of dioxane and 20 ml. of water. The batch is stirred for another 24 hours at room temperature, about 50 ml. of water are added and the solution is cautiously concentrated in a cold waterbath, then washed with 2× 100 ml. of ether, treated with ice, and acidified to pH=about 3 with a 10% solution of citric acid. The acid solution is extracted with 3× 200–250 ml. of methylenechloride, and the organic extracts are dried over magnesium sulphate, filtered and evaporated, to yield white, amorphous L-2,2-dimethyl-3-tertiary butyloxycarbonyl-5β-(N,N' - dicarbomethoxy - hydrazino)-thiazolidine-4-carboxylic acid of the formula

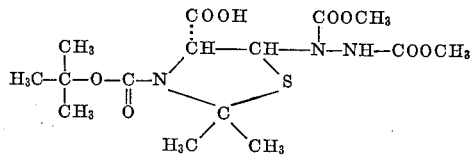

It is dried for several hours at 80° C. in a high vacuum and then crystallized from a small quantity of ether or methylene-chloride; after recrystallization from methylenechloride+cyclohexane it melts at 174° C. with decomposition. Optical rotation $[\alpha]_D$=+86°±1° (c.=1.32 in chloroform). Infrared absorption bands (in methylenechloride) at 2.95, 3.0–4.0 (broad), 5.7–5.9 (broad), 7.35–7.6 (broad), 8.65, 8.95, 9.40, 10.35 and 11.5μ.

Example 11

A solution of 1.15 g. of L-2,2-dimethyl-3-tertiary butyloxycarbonyl-5β-(N,N' - dicarbomethoxy - hydrazino)-thiazolidine-4-carboxylic acid in 20 ml. of anhydrous benzene is mixed with 0.42 ml. of triethylamine and with 0.42 ml. of benzenesulphonylisocyanate. The reaction mixture is stirred at room temperature with exclusion of moisture, then poured into a solution of 0.6 g. of citric acid in 80 ml. of water, and the aqueous solution is extracted three times with methylenechloride. The organic extracts are washed with water, dried and evaporated, and the resulting crude product is purified by counter-current distribution (6 separating funnels; bottom and upper phases 80 ml. each) between benzene and phosphate buffer (pH about 6). Fractions 1, 2 and 3 are combined and crystallized from a mixture of ether and hexane, to yield pure L-2,2-dimethyl-3-tertiary butyloxycarbonyl-5β-(N,N' - dicarbomethoxy - hydrazino)-thiazolidine-4-carboxylic acid N - phenylsulphonylamide of the formula

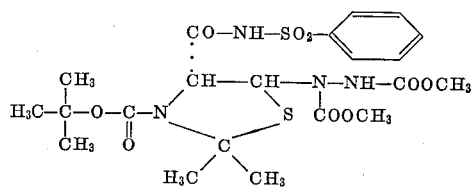

The analytically pure product melts at 113—117° C. Optical rotation $[\alpha]_D^{20}$=—10°±1° (c.=0.932 in chloroform). Infrared absorption bands (in methylenechloride) at 2.96, 5.85 and 7.22μ. Ultraviolet absorption bands (in ethanol) $\lambda_{max}$=222mμ ($\epsilon$=11,000), 260mμ ($\epsilon$=8000), 266mμ ($\epsilon$=1100) and 273mμ ($\epsilon$=900).

Example 12

A mixture of 2 g. of L-2,2-dimethyl-3-tertiary butyloxycarbonyl-thiazolidine-4-carboxylic acid N-acetylamide and 7 g. of azo-dicarboxylic acid diethyl ester is heated with exclusion of moisture for 15 hours at 100° C. and then for 22 hours at 110° C. The excess of azo-dicarboxylic acid diethyl ester is distilled off and the residue chromatographed on 100 g. of silica gel. The crude product is eluted with a 9:1-mixture of benzene and ethyl acetate and for further purification once more chromatographed on silica gel. The L-2,2-dimethyl-3-tertiary butyloxycarbonyl - 5β - (N,N'-dicarbethoxy-hydrazino)thiazolidine-4-carboxylic acid N-acetylamide of the formula

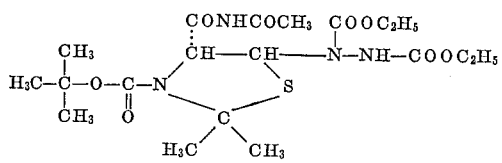

is obtained as a colorless oil. Characteristic infrared absorption bands (in methylenechloride) appear at 2.99 (board), 5.85 (broad) with 6.10 (shoulder), 7.36, 8.25, 8.65 and 9.5μ.

The starting material is prepared as follows:

A solution of 3 g. of L-2,2-dimethyl-3-tertiary butyloxycarbonyl-thiazolidine - 4 - carboxylic acid amide in 75 ml. of absolute benzene is mixed with 0.9 g. of a dispersion of about 50% strength of sodium hydride in mineral oil. The reaction mixture is stirred for one hour at room temperature and then mixed within 40 minutes with 16.5 ml. of a solution of 2 ml. of distilled acetylchloride, diluted with absolute benzene to a volume of 25 ml.; the temperature rises to about 30° C. A clear, yellow solution is obtained which is diluted with 75 ml. of benzene, washed with 75 ml. each of dilute sodium bicarbonate solution and water, the aqueous solutions being washed back with 75 ml. of benzene. The benzene extracts are dried over sodium sulphate and evaporated under reduced pressure, the residue then being dissolved in 60 ml. of dioxane and treated with 30 ml. of a 2% aqueous solution of potassium carbonate solution. The mixture is stirred overnight at room temperature; the organic phase is then extracted with 200 ml. of a 1:1-mixture of benzene and ether, the extracts are washed with 75 ml. each of a semisaturated and a saturated aqueous sodium chloride solution, and the washings are washed back with 75 ml. of benzene. The combined organic extracts are dried over sodium sulphate and evaporated under vacuum. The residue is chromatographed on 80 g. of anhydrous silica gel. The column is first eluted with 800 ml. of hexane, 800 ml. of benzene and 800 ml. of a 19:1-mixture of benzene and ethyl acetate. The following 800 ml. of the same solvent mixture and 2000 ml. of a 9:1-mixture of benzene and ethyl acetate are combined and yield L-2,2-dimethyl - 3 - tertiary butyloxycarbonyl-thiazolidine-4-carboxylic acid N-acetylamide of the formula

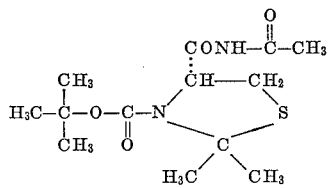

which is crystallized from ether+pentane and then melts at 108–109° C. Optical rotation $[\alpha]_D = -97° \pm 1°$ (c.=0.964 in chloroform); analytical sample:

$[\alpha]_D^{20} = -100° \pm 1°$ (c.=1.041 in chloroform). Infrared absorption bands (in methylenechloride) at 3.00, 5.70, 5.80 (shoulder), 5.88, 5.95 (shoulder), 6.05 (shoulder), 6.85, 7.25 and 7.35μ.

The motor liquor is combined with the first fractions obtained from the 19:1-mixture of benzene and ethyl acetate and with the residue of the fraction eluted with 400 ml. of a 4:1-mixture of benzene and ethyl acetate, and in a similar manner once more chromatographed on 20 g. of anhydrous silica gel. A 9:1-mixture of benzene and ethyl acetate elutes an additional quantity of the desired amide.

Example 13

A mixture of 0.698 g. of L-2,2-dimethyl-3-tertiary butyloxycarbonyl-thiazolidine - 4 - carboxylic acid 2,2,2-trichloroethyl ester and 1.01 g. of azo-dicarboxylic acid di-2,2,2-trichloroethyl ester in 3 ml. of chlorobenzene is heated for 43 hours at 120° C. with exclusion of moisture. After repeated dilution with toluene and benzene, followed in each case by evaporation of the solvent, the residue is chromatographed on 160 g. of slightly basic alumina (activity II, prepared with benzene). The amorphous L-2,2-dimethyl - 3 - tertiary butyloxycarbonyl-5β-(N,N'-dicarbo - 2,2,2 - trichloroethoxy-hydrazino)-thiazolidine-4-carboxylic acid 2,2,2 - trichloroethyl ester of the formula

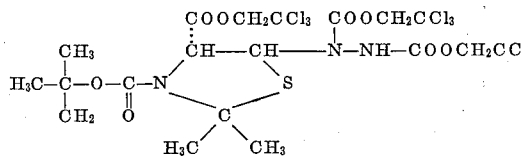

is eluted with a total of 350 ml. of a 93:7-mixture of benzene and ethyl acetate, after having removed the unreacted starting materials by means of 50 ml. fractions (total volume 300 ml.) of 99:1- to 94:6-mixtures of benzene and ethyl acetate. The resulting product reveals infrared absorption bands (in chloroform) at 2.97, 5.66, 5.76, 5.90, 6.75, 7.36, 7.56, 8.30 and 9.10μ. Optical rotation $[\alpha]_D = +40°$ (c.=0.68 in chloroform).

Example 14

A solution of 0.407 g. of L-2,2-dimethyl-3-tertiary butyloxycarbonyl - 5β - (N,N'-dicarbomethoxy-hydrazino)-thiazolidine-4-carboxylic acid and 0.139 g. of p-nitrophenol in 12 ml. of methylenechloride is treated with 0.206 g. of dicyclohexylcarbodiimide; the reaction mixture turns yellowish and the N,N'-dicyclohexyl-urea starts to precipitate. After standing for 4 hours at room temperature, the reaction mixture is filtered, the filtrate is evaporated and the residue is taken up in a mixture of methylenechloride and ether and filtered to remove the urea compound. The filtrate is concentrated and the residue is chromatographed on 25 g. of a diatomaceous earth preparation (Florisil). After washing with benzene, the desired L-2,2-dimethyl-3-tertiary butyloxycarbonyl-5β-(N,N'-dicarbomethoxy - hydrazino) - thiazolidine - 4 - carboxylic acid 4-nitrophenyl-ester of the formula

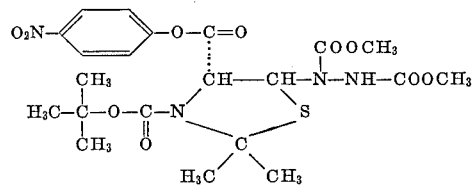

is eluted as a viscous yellowish oil with 250 ml. of benzene containing 5% of ethyl acetate. Infrared absorption bands (in methylenechloride) at 2.95, 5.67, 5.85 (broad), 6.27, 6.53, 6.70, 7.45, 8.33, 8.65, 8.87 9.35 9.87, 10.65 and 11.60μ.

The above product can also be prepared by heating at 100° a mixture of 0.765 g. of L-2,2-dimethyl-3-tertiary butyloxycarbonyl-thiazolidine-4-carboxylic acid 4-nitrophenyl ester and 3 g. of azo-dicarboxylic acid dimethyl ester for 36 hours. The excess of the azo-dicarboxylic acid ester is distilled off and the residue is chromatographed on 80 g. of a diatomaceous earth preparation (Florisil). The L-2,2-dimethyl-3-tertiary butyloxycarbonyl-5β-(N,N' - dicarbomethoxy - hydrazino)-thiazolidine-4-carboxylic acid 4-nitrophenylester is eluted with benzene containing 5% of ethyl acetate after washing the column with benzene, and is identical with the product obtained according to the previous procedure.

The starting material used in the above procedure is prepared as follows: a solution of 2.61 g. of L-2,2-dimethyl-3-tertiary butyloxycarbonyl - thiazolidine - 4 - carboxylic acid in 40 ml. methylenechloride is treated with 1.39 g. of 4-nitrophenol followed by 2.12 g. of dicyclohexyl carbodiimide. After a few minutes, the N,N'-dicyclohexylurea begins to precipitate; the reaction mixture is kept at room temperature for 16 hours, then filtered and evaporated under reduced pressure. The oily residue is dissolved in 25 ml. of benzene, a further amount of N,N'-dicyclohexylurea is filtered off and the benzene solution is evaporated. The residue is chromatographed on 100 g. of silica gel, containing 5% water, the column being prepared in benzene. After washing with 250 ml. of benzene, containing 4% ethyl acetate, the L-2,2-dimethyl-3-tertiary butyloxycarbon-thiazolidine-4-carboxylic acid 4-nitrophenyl-ester of the formula

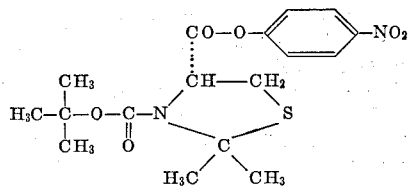

is eluted as a yellowish oil with 250 ml. of benzene, containing 10% of ethyl acetate.

Example 15

The following compounds can be obtained in a way similar to the one described above, i.e. by either adding an azo-dicarboxylic acid ester to the acid derivative or by converting the adduct of the acid and the azo-dicarboxylic acid diester into the adduct of the acid derivative and the azo-dicarboxylic acid diester, by selecting the appropriate starting materials:

N-[L-2,2-dimethyl - 3 - tertiary butyloxycarbonyl - 5 - (N,N-di-carbomethoxy - hydrazino) - 4 - thiazolidinyl-carbonyloxy]-carbamic acid methyl ester;

N-[L-2,2-dimethyl - 3 - tertiary butyloxycarbonyl-5-(N,N'-dicarbomethoxy - hydrazino) - 4 - thiazolidinyl-carbonyloxy]-succinimide;

L-2,2-dimethyl - 3 - tertiary butyloxycarbonyl - 5 - (N, N'-dicarbomethoxy - hydrazino) - thiazolidine - 4 - carboxylic acid amide;

L-2,2-dimethyl - 3 - tertiary butyloxycarbonyl - 5 - (N, N' - dicarbethoxy - hydrazino) - thiazolidine - 4 - carboxylic acid N'-2,4-dinitrophenyl-hydrazide;

N-[L-2,2-dimethyl - 3 - tertiary butyloxycarbonyl - 5 - (N,N'-dicarbomethoxy - hydrazino) - 4 - thiazolidinyl-carbonyl]-triphenylphosphin-imine;

L-2,2-dimethyl - 3 - tertiary butyloxycarbonyl - 5 - (N,N'-dicarbomethoxy - hydrazino) - thiazolidine-4-carboxylic acid N,N-diacetylamide;

L-2,2-dimethyl - 3 - tertiary butyloxycarbonyl-4-cyano-5-(N,N'-dicarbethoxy-hydrazino)-thiazolidine;

L-2,2-dimethyl - 3 - tertiary butyloxycarbonyl-5-(N,N'-dicarbomethoxy - hydrazino) - thiazolidine - 4 - carboxylic acid N'-trityl-hydrazide;

L-2,2-dimethyl - 3 - tertiary butyloxycarbonyl-5-(N,N'-dicarbomethoxy - hydrazino) - thiazolidine - 4 - carboxylic acid N-benzoyloxy-amide;

L-2,2-dimethyl - 3 - tertiary butyloxycarbonyl-5-(N,N'-dicarbomethoxy - hydrazino) - thiazolidine - 4 - carboxylic acid N-cyclohexyl-N-(N-cyclohexylcarbamyl)-amide;

L-2,2-dimethyl - 3 - tertiary butyloxycarbonyl-5-(N,N'-dicarbomethoxy - hydrazino) - thiazolidine - 4 - carboxylic acid N-hydroxy-amide;

L-2,2-dimethyl - 3 - tertiary butyloxycarbonyl - 5 - (N, N'-dicarbomethoxy-hydrazino) - thiazolidine - 4 - carboxylic acid N-(4-methoxy-benzoyloxy)-amide;

L-2,2-dimethyl - 3 - tertiary butyloxycarbonyl-5-(N,N'-dicarbomethoxy - hydrazino) - thiazolidine - 4 - carboxylic acid N' - tertiary butyloxycarbonyl-hydrazide;

N-[L - 2,2 - dimethyl - 3 - tertiary butyloxycarbonyl-5-(N,N'-dicarbomethoxy - hydrazino) - 4 - thiazolidinyl-carbonyl]-N'-tertiary butyloxycarbonyl-diimine;

L - 2,2 - dimethyl - 3 - tertiary butyloxycarbonyl-5-(N,N' - dicarbomethoxy - hydrazino) - thiazolidine - 4 - carboxylic acid N',N'-dimethyl-hydrazide;

L - 2,2 - dimethyl - 3 - tertiary butyloxycarbonyl - 5 - (N,N'-dicarbomethoxy-hydrazino) - thiazolidine - 4 - carboxylic acid N-4-hydroxy-anilide;

L-2,2-dimethyl-3-tertiary butyloxycarbonyl - 5 - (N,N'-dicarbomethoxy-hydrazino) - thiazolidine - 4 - carboxylic acid N-4-pyridyl-amide;

L-2,2-dimethyl-3-tertiary butyloxycarbonyl - 5 - (N,N'-dicarbomethoxy-hydrazino) - thiazolidine - 4 - carboxylic acid N'-diphenylmethylene-hydrazide;

L-2,2-dimethyl-3-tertiary butyloxycarbonyl - 5 - (N,N'-dicarbomethoxy-hydrazino) - thiazolidine - 4 - carboxylic acid N-acetyl-N-acetyloxy-amide, and L-2,2-dimethyl-3-tertiary butyloxycarbonyl - 5 - (N,N'-dicarbomethoxy-hydrazino) - thiazolidine - 4 - carboxylic acid N-acetyloxy-amide.

In the following examples the preparation of the starting materials is shown or the methods are illustrated according to which the free acids are converted into the desired derivatives:

Example A

In the course of 5 minutes a solution of 0.78 g. of dicyclohexyl carbodiimide in about 5 ml. of methylenechloride is slowly but vigorously stirred into a mixture of 0.97 g. of L-2,2-dimethyl-3-tertiary butyloxycarbonyl-thiazolidine-4-carboxylic acid and 0.338 g. of N-hydroxycarbamic acid methyl ester in 25 ml. of methylenechloride. After about 2 minutes N,N'-dicyclohexylurea begins to precipitate and after 16 hours' stirring the precipitate is filtered off and washed with dry benzene. Upon concentration of the filtrate a further quantity of urea settles out and is filtered off. The filtrate is evaporated at 50° C. under 12 mm. Hg and then at 50° C. under 0.1 mm. Hg pressure, to yield a colorless viscid material which crystallizes spontaneously. Recrystallization from a mixture of methylenechloride and hexane at −18° C. yields N-(L-2,2-dimethyl - 3 - tertiary butyloxycarbonyl - 4 - thiazolidinyl-carbonyloxy)-carbamic acid methyl ester of the formula

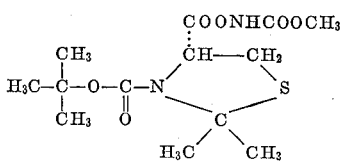

which melts at 112–112.2° C. after recrystallization from hexane. Optical rotation $[\alpha]_D = -122°$ (c.=0.734 in chloroform). Infrared absorption bands (in methylenechloride) at 2.98, 5.69, 5.94, 7.40, 8.63, 9.04, 9.38, 10.60 and 11.66µ.

Example B

In the course of 5 minutes a solution of 1.031 g. of dicyclohexyl carbodiimide in 10 ml. of absolute p-dioxane is stirred dropwise into a solution of 1.305 g. of L-2,2-dimethyl-3-tertiary butyloxycarbonyl - thiazolidine - 4 - carboxylic acid and 0.575 of N-hydroxysuccinimide in 15 ml. of absolute para-dioxane. After stirring for 22 hours at room temperature the N,N'-dicyclohexylurea formed is filtered off and washed with benzene; the filtrate is concentrated and the residue yields crystalline N-(L-2,2-dimethyl-3-tertiary butyloxycarbonyl - 4 - thiazolidinyl-carbonyloxy)-succinimide of the formula

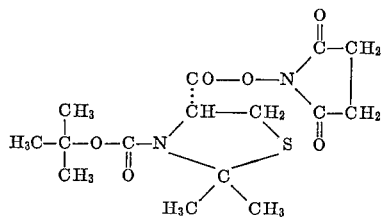

which melts at 154–155° C. after recrystallization from mixtures of acetone+cyclohexane and methylenechloride+hexane. The mother liquors yield a further quantity of the desired product.

Example C

A solution of 1.305 g. of L-2,2-dimethyl-3-tertiary butyloxycarbonyl-thiazolidine-4-carboxylic acid in 20 ml. of dry acetone is mixed, while being stirred and cooled to −6° C., with 0.69 ml. of triethylamine and then dropwise with a cold solution of 0.45 ml. of chloroformic acid ethyl ester in 10 ml. of acetone, rinsing being performed with 10 ml. of acetone. The batch is stirred for 20 minutes at 0° C. and a cold solution of 0.65 g. of sodium azide in 5 ml. of water and 20 ml. of acetone is dropped into the reaction mixture, which has been cooled to −5 to −3° C., containing L-2,2-dimethyl-3-tertiary butyloxycarbonyl - thiazolidine - 4 - carboxylic acid carbethoxy ester. The cooling bath is then removed, the solution stirred for 25 minutes, diluted with a large excess of ice and water and extracted with 3× 100 ml. of methylenechloride. The organic solution is washed three times with water, dried over anhydrous magnesium sulphate and cautiously evaporated in a water-jet vacuum. The clear, viscous-oily residue crystallizes spontaneously when it is scratched and is dried under a high vacuum, to yield L-2,2-dimethyl - 3 - tertiary butyloxycarbonyl-thiazolidine-4-carboxylic acid azide of the formula

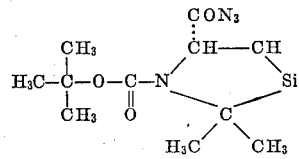

which can be recrystallized from pentane and melts at 45–46° C. Optical rotation $[\alpha]_D^{20} = -123° \pm 1°$ (c.=1.005 in chloroform). Infrared absorption bands (in chloroform) at 4.65, 5.8, 5.9, 5.95, 7.25, 7.35, 8.55 and 9.4μ. Ultraviolet absorption bands (in n-hexane) $\lambda_{max}$ at 195 mμ(end-absorption $\epsilon=16,500$) and 209 mμ(shoulder, $\epsilon=10,700$).

Example D 1.305 grams of L-2,2-dimethyl - 3 - tertiary butyloxycarbonyl-thiazolidine-4-carboxylic acid in 50 ml. of freshly distilled acetonitrile are mixed at −5° C. with 0.69 ml. of triethylamine and then dropwise with 0.49 ml. of chloroformic acid ethyl ester in 25 ml. of acetonitrile, and the reaction mixture is stirred for 20 minutes at −5° C. 1.1 grams of 2,4-dinitrophenyl hydrazine in 150 ml. of acetonitrile are added, rinsing with 100 ml. of the solvent is performed, and the whole is stirred for 1 hour at 0° C., whereupon a homogeneous solution is obtained which is further stirred for 3 hours without cooling. The reaction mixture is diluted with 200 ml. of methylenechloride, extracted with 50 ml. of a cold saturated sodium bicarbonate solution in water, the aqueous extract is washed with 100 ml. of methylenechloride and the combined organic solutions are washed with water until the water runs neutral. The solvent is evaporated and the residue chromatographed on 78 g. of anhydrous silica gel. After having washed out the acetone-2,4-dinitrophenyl hydrazone and the 2,4-dinitrophenyl-hydrazine with benzene+ethyl acetate, the same solvent mixture furnishes L-2,2-dimethyl-3-tertiary butyloxycarbonyl - thiazolidine-4-carboxylic acid N'-2,4-dinitrophenyl hydrazide of the formula

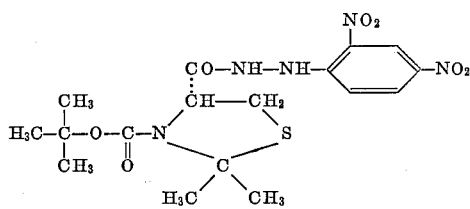

as a viscous, dark yellow oil which crystallizes from a mixture of methylenechloride and hexane and is recrystallized from methylenechloride+cyclohexane. It melts at 115–123° C. with decomposition. Optical rotation $[\alpha]_D^{20} = -99° \pm 1°$ (c.=1.40 in chloroform). Infrared absorption bands (in methylenechloride) at 3.0, 5.90, 5.95, 6.05, 6.20, 6.30, 7.25, 7.35, 7.50, 7.65, 10.90, 11.70 and 12μ. Ultraviolet absorption bands (in ethanol) $\lambda_{max}$. 259 mμ ($\epsilon=10,000$) and 335 mμ ($\epsilon=14,600$).

Example E

A solution of 0.28 g. of L-2,2-dimethyl-3-tertiary butyloxycarbonyl-thiazolidine-4-carboxylic acid azide in 4 ml. of methylenechloride is slowly mixed with 0.256 g. of triphenyl-phosphine in 4 ml. of methylenechloride. After keeping the mixture for 15 minutes, the solvent is evaporated under vacuum and the residue chromatographed on 20 g. of silica gel. The fractions obtained, after prewashing with 90 ml. of a 98:2- and 30 ml. of a 96:4-mixture, with 30 ml. of a 96:4- and 90 ml. of a 75:25-mixture of benzene and methylenechloride are dried at room temperature under a high vacuum and represent pure, non-crystalline L-(N-2,2-dimethyl-3-tertiary butyloxycarbonyl-thiazolidinyl-carbonyl)-triphenylphosphin-imin of the formula

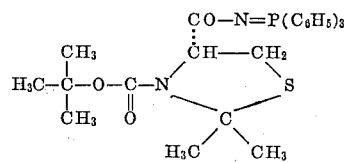

Optical rotation $[\alpha]_D = -81° \pm 1°$ (c.=1.13 in chloroform). Infrared absorption bands (in methylenechloride) at 5.88, 6.39, 7.33, 7.45, 8.55 and 9.00μ. Ultraviolet absorption bands (in ethanol) $\lambda_{max}$. 268 mμ ($\epsilon=3200$), 275 ($\epsilon=2600$) and 355 mμ ($\epsilon=1500$).

Example F

A solution of 1 g. of L-2,2-dimethyl-3-tertiary butyloxycarbonyl-thiazolidine-4-carboxylic acid amide in 25 ml. of absolute benzene is mixed at room temperature with 0.3 g. of a dispersion of about 50% strength of sodium hydride, stirred for 10 minutes and then treated within 15 minutes with exclusion of moisture with 5.5 ml. of a solution of 2 ml. of distilled acetylchloride, diluted with absolute benzene to a total volume of 25 ml., during which the temperature rises to 30° C. The reaction mixture is stirred for 45 minutes, then diluted with 200 ml. of cold pentane and washed with 250 ml. of ice-cold N-sodium hydroxide in 5 portions and then with 50 ml. of water. The aqueous extracts are individually taken up in a mixture of 100 ml. of ice-cold water, 50 ml. of 2 N-acetic acid and 200 ml. of benzene and thoroughly mixed. The aqueous phase is washed with 150 ml. of benzene and the organic washing is washed once with 100 ml. of water.

The combined benzene extracts are dried with sodium sulphate and evaporated under vacuum, and the residue is dissolved in benzene and chromatographed on anhydrous silica gel. 19:1- and 9:1-mixtures of benzene and methylenechloride elute L-2,2-dimethyl-3-tertiary butyloxycarbonyl-thiazolidine-4-carboxylic acid-N-acetylamide which, after recrystallization from ether+pentane, melts at 108–109° C.

The benzene+pentane solution, obtained in the above process after extraction with sodium hydroxide solution, is dried over sodium sulphate and evaporated under vacuum, to yield an oily product which crystallizes after standing for several days at 0° to −5° C. The resulting L-2,2-dimethyl-3-tertiary butyloxycarbonyl-thiazolidine-4-carboxylic acid N,N-diacetylamide of the formula

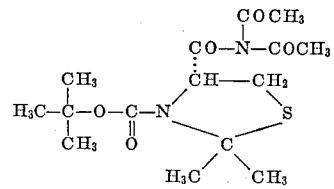

melts at 85–86° C. after having been recrystallized from pentane. Optical rotation $[\alpha]_D^{20} = -194° \pm 1°$ (c.=1.002 in chloroform). Infrared absorption bands (in methylenechloride) at 5.66 (shoulder), 5.80, 5.98, 7.23 and 7.34μ.

Example G

A solution of 0.521 g. of L-2,2-dimethyl-3-tertiary butyloxycarbonyl-thiazolidine-4-carboxylic acid amide in 20 ml. of ethylenechloride is mixed with 0.48 ml. of triethylamine and then, at +2° C., a solution of 0.23 ml. of oxalyl chloride in 20 ml. of ethylenechloride is stirred in dropwise. The temperature rises to +5° C. and the solution quickly turns dark reddish brown. After stirring for 30 minutes at 0° C. 160 ml. of hexane are added at this temperature and the mixture is kept in the cold. The batch is rapidly filtered through anhydrous magnesium sulphate and a filtering aid and the filtrate cautiously evaporated at 25° C. The residue is dissolved in benzene, stirred with a diatomaceous earth preparation (Florisil), filtered and evaporated. The residue crystallizes spontaneously and is recrystallized from pentane, to yield L-4-cyano-2,2-dimethyl-3-tertiary butyloxycarbonyl-thiazolidine of the formula

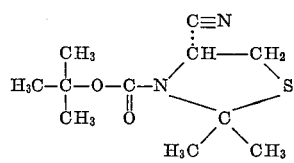

which, after sublimation at 45° C. under 0.001 mm. Hg pressure, melts at 83–86° C. with decomposition. Optical rotataion $[\alpha]_D = -98° \pm 1°$ (c.=1,1,124 in chloroform). Infrared absorption bands (in methylenechloride) at 5.85, 7.25, 7.35, 7.45, 8.15, 8.95, 9.25, 9.41, 10.25 and 11.73μ.

Example H

A solution of 1.305 g. of L-2,2-dimethyl-3-tertiary butyl-oxycarbonyl-thiazolidine-4-carboxylic acid in 20 ml. of methylenechloride is mixed with 0.69 ml. of triethylamine, cooled to −10° C., and treated with a solution of 0.48 ml. of chloroformic acid ethyl ester in 20 ml. of methylenechloride. The reaction mixture is stirred for 1 hour at 0° to −5° C. and then mixed dropwise wtih a pre-cooled solution of 1.58 g. of tritylhydrazine hydrochloride and 0.7 ml. of triethylamine in 50 ml. of methylenechloride. The cooling bath is removed, the reaction mixture stirred for 3½ hours and washed with 50 ml. of a saturated aqueous sodium bicarbonate solution and twice with water, and the organic solution is dried over sodium sulphate and evaporated.

The yellowish oily residue is chromatographed on alumina (activity II), after previously washing with petroleum ether and with benzene, and the amorhpous L-2,2-dimethyl-3-tertiary butyloxycarbonyl - thiazolidine-4-carboxylic acid N'-trityl-hydrazide of the formula

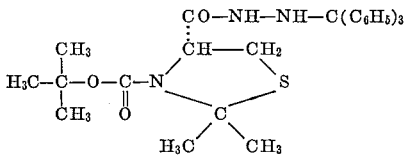

is eluted with 9:1-mixture of benzene and ethyl acetate. Optical rotation $[\alpha]_D = -87° \pm 1°$ (c.=1.027 in chloroform). Infrared absorption bands at 3.00, 3.05, 5.90, 6.00, 7.24, 7.35 and 7.50 (in potassium bromide), and at 2.93, 3.07, 5.92, 7.24, 7.34 and 748μ (in methylenechloride).

Example I

A mixture of L-2,2-dimethyl-3-tertiary butyloxy-carbonyl-thiazolidine-4-carboxylic acid (0.2613 g.) and 0.266 g. of dicyclohexyl carbodiimide in 5 ml. of methylenechloride is mixed with 0.125 g. of O-benzyl-hydroxyamine in 5 ml. of methylenechloride and the whole is kept for 3 hours at room temperature, then filtered, the filtrate cautiously evaporated and the residue dissolved in hexane and a few drops of methylenechloride and the resulting N,N'-dicyclohexylthiourea is filtered off.

The filtrate is evaporated and the oily residue chromatographed on 13 g. of a diatomaceous earth preparation (Florisil). After pre-washing with benzene and a 1:1 mixture of benzene and methylenechloride, elution with methylenechloride and mixtures of methylenechloride+ethyl acetate produces a viscous oil which crystallizes from a mixture of methylenechloride+hexane. The L-2,2-dimethyl-3-tertiary butyloxycarbonyl - thiazolidine-4-carboxylic acid N-benzyloxyamide of the formula

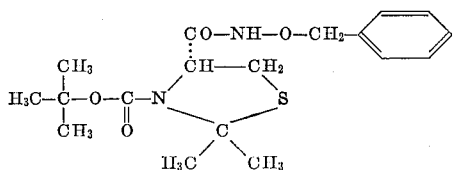

melts after sublimation at 90° C. under 0.001 mm. Hg (for 36 hours) at 117–119.5° C. Optical rotation $[\alpha]_D = -66° \pm 1°$ (c.=0.917 in chloroform). Infrared absorption bands (in methylenechloride) at 2.95, 3.15, 5.90, 6.00, 7.25, 7.35, 7.40, 7.50, 8.60, 9.23, 9.40 and 11.70μ. Ultraviolet absorption bands (in ethanol) $\lambda_{shoulder}$ 215 mμ (ε=4120).

The fraction eluted with benzene and with 1:1-mixture of benzene and methylenechloride yields L-2,2-di-methyl-3-tertiary butyloxycarbonyl-thiazolidine-4-carboxylic acid N-cyclohexyl-N-(N-cyclohexyl-carbamyl)-amide of the formula

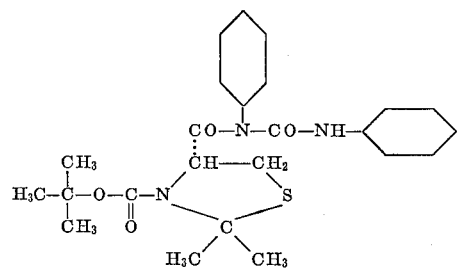

which melts at 145–146.5° C. Optical rotation $$[\alpha]_D = +28° \pm 1°$$

(c.=1.049 in chloroform). Infrared absorption bands (in methylenechloride) at 3.05, 5.86, 6.02, 7.22, 7.58, 8.27, 8.63 and 9.20μ. End absorption in the ultraviolet spectrum (in ethanol).

Example K

A solution of 0.523 g. of L-2,2-dimethyl-3-tertiary butyloxycarbonyl-thiazolidine-4-carboxylic acid in 25 ml. of dry acetone is mixed at −9° C. with 0.28 ml. of triethylamine, and then 0.195 ml. of chloroformic acid ethyl ester in 15 ml. of acetone is stirred in dropwise. After 15 minutes the precipitate formed is filtered off, the filtrate evaporated to dryness and the residue dissolved twice in benzene and each time evaporated to expel the acetone. The residue is dissolved in 200 ml. of chloroform, cooled up to −5° C. and in the course of 15 minutes a solution of 20 millimols of hydroxylamine (freshly prepared from 1.39 g. of finely powdered hydroxylamine hydrochloride and 2.8 ml. of triethylamine) in 12 ml. of methanol is vigorously stirred in dropwise. The batch is cooled for 30 minutes at −3° C., the cooling bath then removed, and the solution is stirred for 4 hours at room temperature, diluted with 150 ml. of methylenechloride and washed twice with ice-cold 1 N-aqueous sodium bicarbonate solution and then with water. After drying, the organic solution is evaporated and the semi-crystalline yellow oil is crystallized from benzene, to yield L-2,2-dimethyl-3-tertiary butyloxycarbonyl - thiazolidine-4-carboxylic acid N-hydroxyamide of the formula

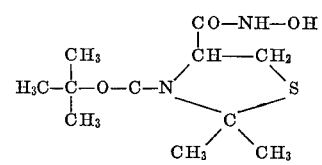

which melts at 136.5–137° C. after having been twice recrystallized from a mixture of methylenechloride and hexane. Optical rotation $[\alpha]_D = -105° \pm 1°$ (c.=1.05 in chloroform). Infrared absorption bands (in methylenechloride) at 2.94, 3.05–3.15, 5.99, 7.24, 7.35, 7.49, 8.10, 9.23, 9.40, 10.33 and 11.70μ.

Example L

A mixture of 0.377 g. of L-2,2-dimethyl-3-tertiary butyloxycarbonyl-thiazolidine - 4 - carboxylic acid N-hydroxyamide in 30 ml. of methylenechloride is mixed with 0.21 ml. of triethylamine and then dropwise at 0° C. with 0.256 g. of anisoylchloride in 20 ml. of methylenechloride. The match is stirred for 30 minutes at 0° C. and then for 30 minutes at room temperature; the solution is twice washed with aqueous sodium bicarbonate solution and with water, dried and evaporated, to yield glassy L-2,2-dimethyl-3-tertiary butyloxycarbonyl-thiazolidine - 4 - carboxylic acid N-4-methoxybenzoyloxyamide of the formula

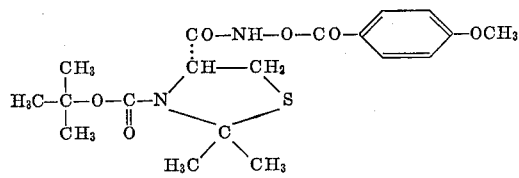

Optical rotation $[\alpha]_D = -100° \pm 1°$ (c.=1.55 in chloroform). Infrared absorption bands (in methylenechloride) at 3.1 (weak), 5.68, 5.85, 6.05, 6.22, 6.62, 7.21, 7.32, 7.43, 8.55, 9.35, 9.73 and 11.80μ. Ultraviolet absorption bands $\lambda_{max}$ 210 mμ ($\epsilon$=17,400) and 262 mμ ($\epsilon$=18,300), taken in ethanol.

Example M

A solution of 2.936 g. of L-2,2-dimethyl-3-tertiary butyloxycarbonyl - thiazolidine - 4 - carboxylic acid in 22.5 ml. of methylenechloride is mixed with 1.55 ml. of triethylamine, cooled to −10° C., and then treated dropwise, while being stirred, with 1.08 ml. of chloroformic acid ethyl ester in 22.5 ml. of methylenechloride. The mixture is stirred for 1 hour at −10° C., and 1.5 g. of N-tertiary butyloxycarbonyl-hydrazine are tipped in. The cooling bath is removed. The batch is further stirred and then kept overnight, then extracted with 40 ml. of 5% aqueous sodium bicarbonate solution and washed neutral with water; the organic solution is dried over sodium sulphate and evaporated and the crystalline residue is recrystallized from a mixture of methylenechloride and hexane. The resulting L-2,2-dimethyl-3-tertiary butyloxycarbonyl-thiazolidine-4-carboxylic acid N' - tertiary butyloxycarbonyl-hydrazine of the formula

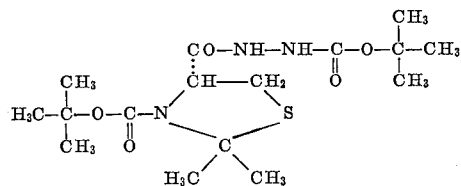

melts at 135–136.5° C., after recrystallization from acetone+hexane. Optical rotation $[\alpha]_D^{20} = -84°$ (c.=1.25 in chloroform). Infrared absorption bands (in methylenechloride) at 2.04, 5.75 (shoulder), 5.9 (broad), 6.78, 7.35, 8.20 and 8.65μ.

Example N

A stirred solution of 0.378 g. of L-2,2-dimethyl-3-tertiary butyloxycarbonyl-thiazolidine-4-carboxylic acid N-tertiary butyloxycarbonyl hydrazide in 6 ml. of anhydrous acetonitrile is treated with 0.58 g. of lead tetraacetate and the mixture is stirred on for 15 minutes. The resulting suspension is evaporated to a volume of 2 to 3 ml. without application of external heat, then diluted with 2 ml. of ether and 20 ml. of hexane, stirred and after 5 minutes filtered. The filtrate is evaporated almost completely at room temperature under vacuum, the semisolid residue extracted with 20 ml. of hexane, and the organic extract dried over sodium sulphate and evaporated under vacuum. The red, very viscous oil is dried at room temperature under, a pressure of 0.05 mm. Hg; it is N-(L-2,2-dimethyl-3-tertiary butyloxycarbonyl-4-thiazolidinyl-carbonyl)N'-tertiary butyloxycarbonyl-diimine of the formula

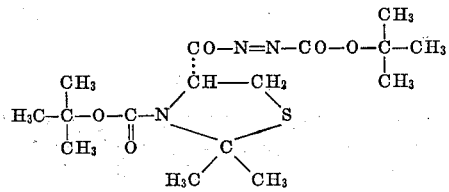

Optical rotation $[\alpha]_D = -21° \pm 1°$ (c.=1.20 in chloroform). Infrared absorption bands (in methylenechloride) at 5.65, 5.86, 7.33, 7.40, 9.35 and 12.00μ. Ultraviolet absorption bands (in ethanol): end absorption $\lambda_{max}$ at 440 mμ.

Example O

A solution of 2.615 g. of L-2,2-dimethyl-3-tertiary butyloxycarbonyl-thiazolidine-4-carboxylic acid in 200 ml. of methylenechloride is cooled to −9° C. and mixed with 1.4 ml. of triethylamine and then dropwise with 0.96 ml. of chloroacetic acid ethyl ester in 50 ml. of methylenechloride. The batch is stirred for one hour at 0° C., cooled to −10° C., a solution of N,N-dimethylhydrazine in 50 ml. of methylenechloride is slowly added and the mixture is stirred for 7 hours, the cooling bath being removed after 2 hours. The reaction mixture is diluted with 200 ml. of methylenechloride, extracted with 3× 50 ml. of saturated aqueous sodium bicarbonate solution, washed neutral with water, dried over magnesium sulphate and evaporated at room temperature or a slightly higher temperature in a high vacuum (about 0.01 mm. Hg). The crystalline residue is purified by sublimation at 100° C. under 0.001 mm. Hg pressure or by recrystallization from methylenechloride+hexane. The resulting L-2,2-dimethyl-3-tertiary butyloxy-carbonyl-thiazolidine-4-carboxylic acid N',N'-dimethylhydrazide of the formula

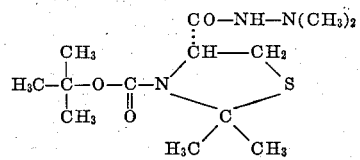

melts at 153–153.5° C. Optical rotation $[\alpha]_D = -85° \pm 1°$ (c.=1.236 in chloroform). Infrared absorption bands (in methylenechloride) at 3.1 (weak), 5.95, 7.25, 7.45, 8.60, 9.25 and 9.40μ.

Example P

A solution of 2.6 g. of L-2,2-dimethyl-3-tertiary butyloxycarbonyl-thiazolidine-4-carboxylic acid in 10 ml. of methylenechloride is mixed with 1.01 g. of triethylamine in 3 ml. of methylenechloride and then with 1.08 g. of chloroformic acid ethyl ester in 3 ml. of methylenechloride at −5° C., and the mixture is stirred for a further 45 minutes at this temperature. A solution of 1.09 g. of p-aminophenol in 10 ml. of dimethylformamide is added at 0° C. The whole is stirred for 16 hours at room temperature, the solvents are evaporated at 40° C. under 10 mm. Hg pressure, the residue is extracted with ethyl acetate and the organic solution is washed with aqueous sodium bicarbonate solution and water, dried over magnesium sulphate and evaporated under vacuum. The semisolid residue is crystallized from ethyl acetate+heptane and yields L - 2,2 - dimethyl - 3 - tertiary butyloxycarbonyl - thiazolidine-4-carboxylic acid N-4-hydroxyanilide of the formula

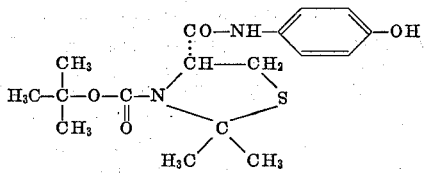

31 melting at 205 to 207° C. Infrared absorption bands in methylenechloride at 2.75, 3.00 and 5.95; and in potassium bromide at 3.0, 5.95, 6.24, 6.35 and 6.60μ. Ultraviolet absorption bands (in methanol) λ_max 208 mμ (ε=12,500) and 253 mμ (ε=15,000).

Example Q

A solution of 0.78 g. of L-2,2-dimethyl-3-tertiary butyloxycarbonyl - thiazolidine - 4 - carboxylic acid in 20 ml. of acetonitrile, containing 0.42 ml. of triethylamine, is stirred into a suspension of 0.76 g. of 3-(2-ethyl-5-isoxazolinium)-benzenesulphonate (Woodward reagent K) in 20 ml. of acetonitrile; the mixture is stirred for 1 hour at 0° C. and then mixed with 0.282 g. of 4-aminopyridine in 20 ml. of acetonitrile. After stirring for 16 hours at room temperature the solvent is evaporated under vacuum, ethyl acetate is added, and the organic extract is washed successively with water, aqueous sodium bicarbonate solution and water, dried over magnesium sulphate and evaporated under vaccum. The residue is chromatographed on alumina (activity III) and L-2,2-dimethyl-3-tertiary butyloxycarbonyl-thiazolidine-4-carboxylic acid N-4-pyridylamide of the formula

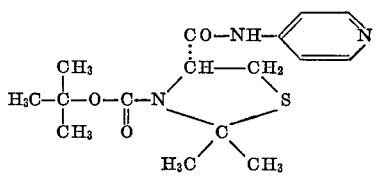

eluted with a 7:3-mixture of benzene and ethyl acetate. The product is crystallized from acetone+cyclohexane; it melts at 195-197° C. Optical rotation [α]_D^20=—143° (c.=0.99 in chloroform). Infrared absorption bands (in methylenechloride) at 2.90, 5.90 and 6.0μ. Ultraviolet absorption bands (in methanol) λ_max 246 mμ (ε=16,850) and protonized (mineral acid) λ_max 272 mμ.

A solution of 0.185 g. of L-2,2-dimethyl-3-tertiary butyloxycarbonyl-thiazolidine-4-carboxylic acid N-4-pyridylamide in 3 ml. of acetone, containing an excess of methyl iodide, is kept for 16 hours and then evaporated under vacuum. The residue yields amorphous L-2,2-di-'methyl-3-tertiary butyloxycarbonyl-thiazolidine-4-carboxylic acid N-(1-methyl-4-pyridinium)-amide iodide melting at 120° C. Infrared absorption bands in methylenechloride at 5.60, 5.80 and 6.09μ, and in potassium bromide at 5.82, 6.01 and 6.13μ. Ultraviolet absorption bands (in methanol) λ_max 277 mμ (ε=29,300) and basic λ_max 324 mμ (ε=24,600).

Example R

A solution of 2.615 g. of L-2,2-dimethyl-3-tertiary butyloxycarbonyl-thiazolidine-4-carboxylic acid in 100 ml. of methylenechloride is cooled to —7° C. and mixed with 1.4 ml. of triethylamine and then dropwise with 0.96 ml. of chloroformic acid ethyl ester in 60 ml. of methylenechloride. The reaction mixture is stirred for one hour at —5 to 0° C., then slowly mixed with 1.9 g. of benzophenonehydrazone in 50 ml. of methylenechloride at —7° C. and stirred for 30 minutes at this temperature. The cooling bath is removed, the batch stirred on for 3 hours and the colorless solution is diluted with 100 ml. of methylenechloride, washed with 80 ml. of ice-cold 1 N aqueous sodium bicarbonate solution and with water, dried over magnesium sulphate and evaporated. The residue is chromatographed on 210 g. of a diatomaceous earth preparation (Florisil). The fore-runnings obtained with a 95:5-mixture of benzene and ethyl acetate are discarded and the main product, eluted with this solvent mixture, is crystallized from a mixture of ether and hex-

32 ane. The resulting L-2,2-dimethyl-3-tertiary butyloxycarbonyl-thiazolidine-4-carboxylic acid N'-diphenylmethylenehydrazide of the formula

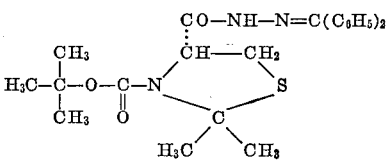

melts at 134-135° C. after recrystallization from methylenechloride+hexane. Optical rotation [α]_D=—93°±1° (c.=1.063 in chloroform). Infrared absorption bands (in methylenechloride) at 3.04, 5.93, 6.25, 7.35-7.50, 8.60 and 9.37μ. Ultraviolet absorption bands (in ethanol) λ_max 220 mμ (ε=20,750) and about 290 mμ (ε=22,150).

Example S

A solution of 0.2763 g. of L-2,2-dimethyl-3-tertiary butyloxycarbonyl-thiazolidine-4-carboxylic acid N-hydroxyamide in 2 ml. of acetic anhydride and 2 ml. of pyridine is kept overnight at room temperature, then diluted with benzene and heptane and evaporated to dryness. The dilution and evaporation are repeated several times until all pyridine and acetic acid have been removed. The resulting viscous oil is dissolved in 200 ml. of methylenechloride, stirred with 5 g. of silica gel, filtered and evaporated. The residue is distilled and yields the desired L-2,2-dimethyl-3-tertiary butyloxycarbonyl-thiazolidine-4-carboxylic acid N-acetyl-N-acetyloxyamide of the formula

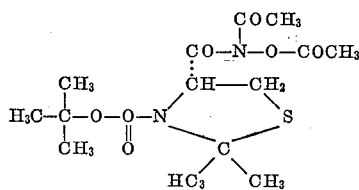

melting at 135° C. under 0.001 mm. Hg pressure. Optical rotation [α]_D=—83°±0.4° (c.=2.665 in chloroform). Infrared absorption bands (in methylenechloride) at 5.58, 5.80-5.95, 7.43, 8.28, 8.60, 9.24, 9.37, 9.82, 10.28, 10.47, 11.00, 11.20, 11.65 and 11.85μ.

Example T

A solution of 1.382 g. of L-2,2-dimethyl-3-tertiary butyloxycarbonyl-thiazolidine-4-carboxylic acid N-hydroxyamide in 75 ml. of methylenechloride is mixed with 0.834 ml. of triethylamine, cooled to 0° C. and 0.4265 ml. of acetylchloride in 75 ml. of methylenechloride is stirred in dropwise. The mixture is stirred for 50 minutes at 0° C. and then overnight at room temperature, diluted with 200 ml. of methylenechloride, extracted with 2× 50 ml. of ice-cold saturated aqueous sodium bicarbonate solution and washed with 50 ml. of cold water. After drying over magnesium sulphate the organic solution is evaporated and the crystalline residue recrystallized from methylenechloride+hexane, to yield L-2,2-dimethyl-3-tertiary butyloxycarbonyl-thiazolidine-4-carboxylic acid N-acetyloxyamide of the formula

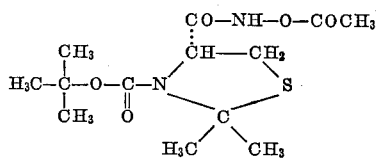

melting at 128-129° C. Optical rotation [α]_D=—105°±1° (c.=1.186 in chloroform). Infrared absorption bands (in methylenechloride) at 5.85, 5.86, 6.02, 7.22, 7.35, 7.46, 8.58, 8.95, 9.20, 9.36, 9.54 and 11.67μ.

Example 16

A solution of 0.3 g. of L-2,2-dimethyl-3-tertiary butyloxycarbonyl - 5β - (N,N'-dicarbomethoxy-hydrazino)- thiazolidine-4-carboxylic acid in 11 ml. of 1 N sodium hydroxide solution is kept for 26 hours at room temperature, then acidified with citric acid to pH 5 and repeatedly extracted with ethyl acetate. The yellow residue from the dried extract is amorphous L-2,2-dimethyl-3-tertiary butyloxycarbonyl - 5β - hydrazino - thiazolidine - 4 - carboxylic acid of the formula

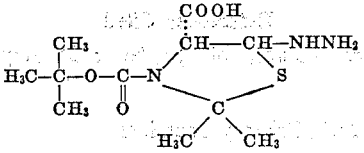

which reveals in the nuclear magnetic resonance spectrum (in CDCl$_3$+D$_2$O) signals at δ=1.45 p.p.m. (3 CH$_3$), 1.81 p.p.m. and 1.85 p.p.m. (2× CH$_3$), 5.12 p.p.m. (1 H) and 6.3 p.p.m. (1 H).

Example 17

A mixture of 1.05 g. of 7-phenylacetylaminocephalosporanic acid benzhydrylester in 1.5 ml. of waterfree methylene chloride and 3.5 ml. of azo-dicarboxylic acid dimethylester is warmed slightly, whereupon a solution is formed, and is then allowed to stand for 64 hours at room temperature. The reaction mixture is placed upon a column of 130 g. of silica gel, the excess of azodicarboxylic acid dimethylester (3.65 g.) is washed out with methylene chloride and the reaction product is eluted with ethyl acetate; apart from the two isomers of 2-(N,N'-dicarbomethoxy - hydrazino) - 7 - phenylacetylaminocephalosporanic acid benzhydrylester of the formula

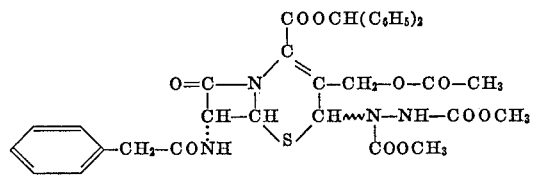

two more polar by-products are obtained in small amounts. The less polar product is chromatographed on 85 g. of silica gel and 0.74 g. of one isomer is eluted with methylene chloride, containing 5 to 7% of ethyl acetate; it melts at 152–152.5° C. (in the form of fine granular crystals) and at 141–142° C. (in the form of fine needles) after crystallization from a mixture of methylene chloride and cyclohexane; [α]$_D$=−41°±1° (C.=1.066 in chloroform); ultraviolet absorption spectrum (in ethanol): λ$_{max}$=265 mμ (ε=6500).

The second isomer is eluted with methylene chloride containing 10–15% of ethyl acetate and purified by repeated chromatography on silica gel; ultraviolet absorption spectrum (in ethanol): 5λ$_{max}$=265 μ.

Example 18

A mixture of 4.4 g. of tetrahydrothiophene and 14.6 g. of azodicarboxylic acid dimethylester is allowed to stand at room temperature for 24 hours. The excess of azodicarboxylic acid dimethylester is distilled off at 40°/0.005 mm. Hg; the remaining slightly yellow resin represents the 2-(N,N'-dicarbomethoxy-hydrazino) - tetrahydrothiophene of the formula

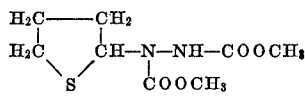

which cannot be distilled without decomposition; infrared absorption bands (in methylene chloride) at 2.85μ, 5.65μ, 5.76μ, 6.68μ, 6.92μ, 7.75μ, 8.20μ, 8.95μ and 9.40μ; signal in the mass spectrum at 234 mass units.

What is claimed is:
1. A 5-hydrazino-thiazolidine of the Formula IVa

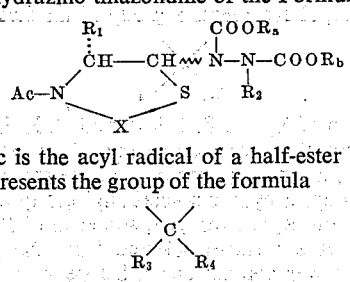

wherein Ac is the acyl radical of a half-ester of carbonic acid, X represents the group of the formula

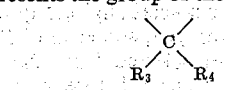

in which each of R$_3$ and R$_4$ is lower alkyl, R$_1$ stands for a member selected from the group consisting of a free carboxyl group, a carboxyl group esterified with a member selected from the group consisting of a lower alkanol, a halogeno-lower alkanol and a phenol, a carbamyl group, a carbamyl group substituted by a member selected from the group consisting of lower alkyl, lower alkanoyl and phenylsulfonyl and a nitrile group, each of the groups R$_a$ and R$_b$ is the residue of an alcohol selected from the group consisting of a lower alkanol and a halogeno-lower alkanol, and R$_2$ is a member selected from the group consisting of hydrogen and lower alkyl.

2. A 5-hydrazino-thiazolidine as claimed in claim 1 and having the formula

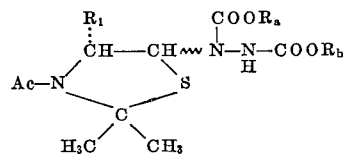

in which Ac represents the acyl residue of a half-ester of carbonic acid, R$_1$ represents a member selected from the group consisting of a free carboxyl group, a carboxyl group esterified by a lower alkanol and a carboxyl group esterified by a halogenated lower alkanol, and each of the groups R$_a$ and R$_b$ stands for the residue of an alcohol selected from the group consisting of lower alkanols and halogenated lower alkanols.

3. A 5-hydrazino-thiazolidine as claimed in claim 1 and being the L-2,2-dimethyl-3-tertiary butyloxycarbonyl-5β-(N,N'-dicarbomethoxy-hydrazino)-thiazolidine - 4 - carboxylic acid methyl ester.

4. A 5-hydrazino-thiazolidine as claimed in claim 1 and being the L-2,2-dimethyl-3-tertiary butyloxycarbonyl-5β-(N,N'-dicarbethoxy-hydrazino)-thiazolidine - 4 - carboxylic acid methyl ester.

5. A 5-hydrazino-thiazolidine as claimed in claim 1 and being the L-2,2-dimethyl-3-tertiary butyloxycarbonyl-5β-(N,N'-dicarbomethoxy-hydrazino) - thiazolidine - 4 - carboxylic acid 2,2,2-trichloroethyl ester.

6. A 5-hydrazino-thiazolidine as claimed in claim 1 and being the L-2,2-dimethyl-3-tertiary butyloxycarbonyl-5β-[N,N'-di-(carbo-2,2,2,-trichloroethoxy) - hydrazino]-thiazolidine-4-carboxylic acid methyl ester.

7. A 5-hydrazino-thiazolidine as claimed in claim 1 and being the L-2,2-dimethyl-3-tertiary butyloxycarbonyl-5β-(N,N'-dicarbethoxy-hydrazino)-thiazolidine - 4 - carboxylic acid.

8. A 5-hydrazino-thiazolidine as claimed in claim 1 and being the L-2,2-dimethyl-3-tertiary butyloxycarbonyl-5β-(N,N'-dicarbomethoxy-hydrazino) - thiazolidine - 4-carboxylic acid.

9. Process for the preparation of compounds of the formula

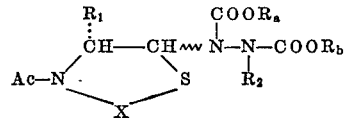

in which Ac stands for the acyl radical of a semi-ester of carbonic acid, X represents a group of the formula

in which each of $R_3$ and $R_4$ is lower alkyl, $R_1$ is a member selected from the group consisting of an esterified carboxyl group, a carbamyl group, a nitrile group, an azido-carbonyl group, a hydrazino-carbonyl group and an azo-carbonyl group, $R_2$ is hydrogen, and each of $R_a$ and $R_b$ is the residue of a member selected from the group consisting of a lower alkanol and a halogeno-lower alkanol, which comprises reacting a compound of the formula

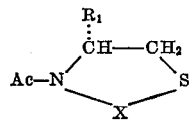

in which Ac, X and $R_1$ are defined as above, with an azo-dicarboxylic acid ester of the formula $$R_aOOC-N=N-COOR_b$$

in which $R_a$ and $R_b$ are defined as above, at an elevated temperature which is below the decomposition temperature of the azo-dicarboxylic acid ester.

References Cited

Woodward, Science, vol. 153, No. 3735, July 29, 1966, pp. 487-93.

ALEX MAZEL, Primary Examiner

R. J. GALLAGHER, Assistant Examiner

U.S. Cl. X.R.

260—243, 332.2, 483